(12) United States Patent
Urayama et al.

(10) Patent No.: US 12,028,002 B2
(45) Date of Patent: Jul. 2, 2024

(54) MOTOR CONTROL DEVICE

(71) Applicant: FUJITSU GENERAL LIMITED, Kanagawa (JP)

(72) Inventors: Masaharu Urayama, Kanagawa (JP); Yuki Saito, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 214 days.

(21) Appl. No.: 17/789,921

(22) PCT Filed: Dec. 9, 2020

(86) PCT No.: PCT/JP2020/045886
§ 371 (c)(1),
(2) Date: Jun. 29, 2022

(87) PCT Pub. No.: WO2021/153020
PCT Pub. Date: Aug. 5, 2021

(65) Prior Publication Data
US 2022/0399843 A1    Dec. 15, 2022

(30) Foreign Application Priority Data

Jan. 31, 2020   (JP) ................................ 2020-015699

(51) Int. Cl.
*H02P 21/05* (2006.01)
*H02P 21/00* (2016.01)
(Continued)

(52) U.S. Cl.
CPC .......... *H02P 21/05* (2013.01); *H02P 21/0003* (2013.01); *H02P 21/20* (2016.02); *H02P 21/22* (2016.02); *H02P 27/06* (2013.01)

(58) Field of Classification Search
CPC .......... H02P 21/05; H02P 21/20; H02P 21/22; H02P 27/06; H02P 21/0003
See application file for complete search history.

(56) References Cited

U.S. PATENT DOCUMENTS

| | | | |
|---|---|---|---|
| 8,344,680 B2 * | 1/2013 | Kitanaka | H02P 21/22 318/632 |
| 9,007,004 B2 * | 4/2015 | Hunter | H02P 21/18 318/609 |

(Continued)

FOREIGN PATENT DOCUMENTS

| CN | 106961232 | 7/2017 |
|---|---|---|
| JP | 2017-139892 | 8/2017 |

(Continued)

OTHER PUBLICATIONS

Feb. 16, 2021 International Search Report issued in International Patent Application No. PCT/JP2020/045886, with an English translation thereof.

(Continued)

*Primary Examiner* — Thai T Dinh
(74) *Attorney, Agent, or Firm* — GREENBLUM & BERNSTEIN, P.L.C.

(57) ABSTRACT

A motor control device capable of improving damping effects of a motor. In a motor control device, a control switching determination unit determines whether or not a control region of a motor is in a voltage saturation region. A voltage command value generator generates a voltage command value of the motor based on a velocity command value and a velocity of the motor. When the control switching determination unit determines that the control region of the motor is in the voltage saturation region, the voltage command value generator determines a voltage vector angle of an output voltage applied to the motor from a total torque command value and a limit value of the maximum voltage capable of being output to the motor, and generates a voltage command value based on the voltage vector angle.

4 Claims, 13 Drawing Sheets

(51) Int. Cl.
    *H02P 21/20*     (2016.01)
    *H02P 21/22*     (2016.01)
    *H02P 27/06*     (2006.01)

(56) References Cited

U.S. PATENT DOCUMENTS

| | | | |
|---|---|---|---|
| 9,473,058 B2 * | 10/2016 | Ogi | H02P 21/22 |
| 10,511,244 B2 * | 12/2019 | Ishino | H02P 6/185 |
| 2013/0009575 A1 | 1/2013 | Yoo | |
| 2014/0312812 A1 | 10/2014 | Sasaki et al. | |
| 2016/0079900 A1 | 3/2016 | Ogi et al. | |

FOREIGN PATENT DOCUMENTS

| | | |
|---|---|---|
| JP | 2017-158414 | 9/2017 |
| JP | 2017-158415 | 9/2017 |
| JP | 2019-180173 | 10/2019 |
| JP | 2019-201471 | 11/2019 |
| JP | 2019-213309 | 12/2019 |

OTHER PUBLICATIONS

Office Action from Intellectual Property India in Indian Pat. Appl. No. 202217043502, dated Feb. 9, 2023.

Jan. 26, 2024 Extended European search report in corresponding European Application No. 20916873.1.

* cited by examiner

MOTOR CONTROL DEVICE

FIELD

The present disclosure relates to a motor control device.

BACKGROUND

In a compressor used in an air conditioner, load torque periodically fluctuates during one rotation of a rotor of a motor that drives the compressor. The periodic load torque fluctuation is generated by pressure change of refrigerant gas during each process of suction, compression, and discharge, and causes vibration of a motor due to fluctuation in a rotational velocity (hereinafter, may be simply referred to as "velocity fluctuation") of the motor. When a compressor in which such load torque fluctuation occurs is used, "torque control (periodic disturbance inhibiting control)" is performed to inhibit the fluctuation in a rotational velocity of a motor.

Usually, the vibration of a motor remarkably appears in a low-speed rotation region (e.g., normal control region where motor maximum torque/current control is performed). The vibration, however, occurs even in a high-speed rotation region (e.g., voltage saturation region where weak magnetic flux control is performed) depending on a specification and a load condition of the motor, and a peak current of the motor is increased by the occurrence of the vibration. Furthermore, when the peak current of the motor increases, a protection function of an inverter may operate to prevent demagnetization of the motor, which may stop the motor.

Therefore, as torque control in the voltage saturation region where the weak magnetic flux control is performed, there has been proposed a technique of performing torque control in the voltage saturation region by fluctuating a voltage vector angle indicating the phase of an output voltage in synchronization with velocity fluctuation while restricting the output voltage to equal to or less than a DC voltage capable of being output by an inverter.

CITATION LIST

Patent Literature

Patent Literature 1: JP 2017-158414 A
Patent Literature 2: JP 2017-158415 A

SUMMARY

Technical Problem

When the torque control in the voltage saturation region is performed by fluctuating the voltage vector angle of an output voltage to the velocity fluctuation, however, man-hours have been needed to adjust the phase of the voltage vector angle fluctuation by tuning. Therefore, even if the phase of the voltage vector angle fluctuation is tuned under a certain condition and damping effects can be obtained, the voltage vector angle fluctuation for generating the optimum output torque is not achieved if the specification, a load condition, and the like of an inverter and a motor change. The damping effects may fail to be sufficiently exhibited.

Therefore, the present disclosure proposes a technique capable of improving the damping effects of a motor.

Solution to Problem

In one aspect of the disclosed embodiment, a motor control device includes a voltage command value generator and a control switching determination unit. The a control switching determination unit determines whether or not a control region of the motor is in a voltage saturation region. The voltage command value generator generates a voltage command value of a motor from a torque command value based on a velocity command value and a velocity of the motor, and generates the voltage command value based on the torque command value, a limit value of a maximum voltage capable of being output to the motor, and a voltage vector angle of an output voltage applied to the motor when the control switching determination unit determines that the control region is in the voltage saturation region.

Advantageous Effects of Invention

According to the present disclosure, damping effects of a motor can be improved.

DESCRIPTION OF EMBODIMENTS

Embodiments of the present disclosure will be described below with reference to the drawings. In the following embodiments, the same configurations are denoted by the same reference signs.

In the present disclosure, a motor control device that performs torque control for a permanent magnet synchronous motor (PMSM) that drives a compressor having periodic load torque fluctuations by position sensorless vector control, for example, a motor control device used in an air conditioner, a low-temperature storage device, and the like will be described in one example. The disclosed technology, however, can be widely applied to a motor control device that performs torque control for a motor that drives a load having periodic load torque fluctuations.

First Embodiment

<Operation of Motor Control Device>

Figure 1A:
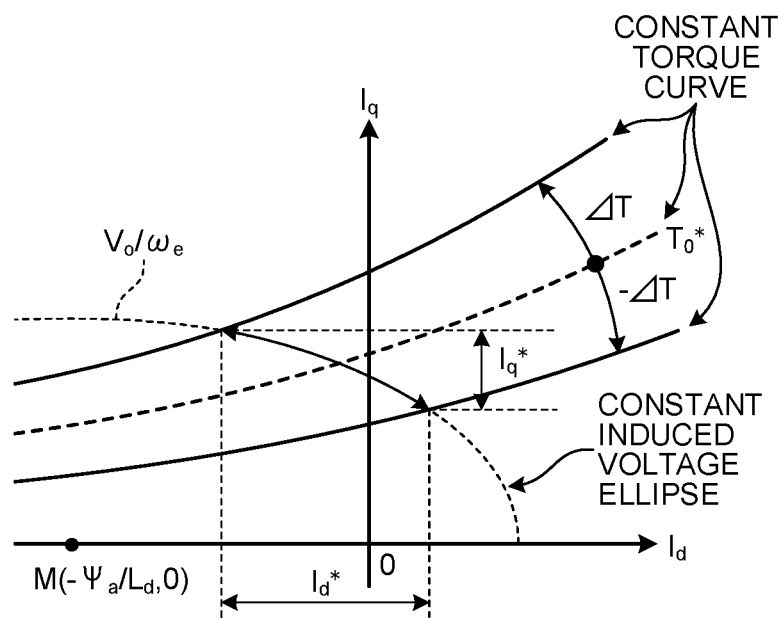
FIG. 1A illustrates an operation example of a motor control device according to a first embodiment of the present disclosure.
Figure 1B:
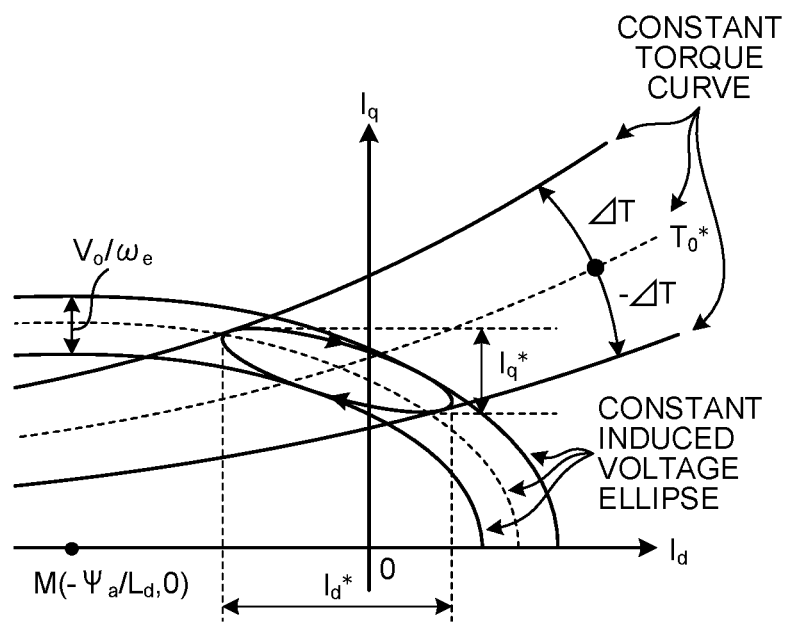
FIG. 1B illustrates an operation example of the motor control device according to the first embodiment of the present disclosure.

FIGS. 1A and 1B illustrate an operation example of a motor control device according to a first embodiment of the present disclosure.

Constant induced voltage ellipses in FIGS. 1A and 1B (parts of ellipses are illustrated in FIGS. 1A and 1B) are current vector loci in which induced voltages Vo of a motor are equal. As an electrical angle estimated angular velocity ωe increases, the diameter of a constant induced voltage ellipse decreases. A constant induced voltage ellipse in FIG. 1A indicates a current vector locus in the case where the electrical angle estimated angular velocity ωe is constant. Furthermore, a constant induced voltage ellipse in FIG. 1B indicates a current vector locus in the case where the electrical angle estimated angular velocity ωe fluctuates due to load torque fluctuation. FIG. 1B illustrates a constant induced voltage ellipse at the maximum value of the electrical angle estimated angular velocity ωe, a constant induced voltage ellipse at the minimum value of the electrical angle estimated angular velocity ωe, and a constant induced voltage ellipse at the average value of the electrical angle estimated angular velocity ωe.

When torque control is performed in a voltage saturation region where weak magnetic flux control of the motor is performed, as illustrated in FIG. 1B, the motor control device of the present disclosure calculates a q-axis current command value Iq* and a d-axis current command value Id* based on a point of intersection of a constant torque curve T* (=To*±ΔT) that fluctuates by ±ΔT due to the torque control and a fluctuating constant induced voltage ellipse. For example, the motor control device of the present disclosure calculates the d-axis current command value Id* and the q-axis current command value Iq* based on a point of intersection of the constant torque curve and the constant induced voltage ellipse. The constant torque curve is a current locus in which a total torque command value T* is constant. The total torque command value T* is obtained by adding a fluctuating torque command value ΔT, which is correction torque, to an average torque command value To*. The constant induced voltage ellipse is a current locus in which an induced voltage command value Vo* and the electrical angle estimated angular velocity ωe for causing an output voltage amplitude Va (amplitude of voltage command value) to have a desired amplitude are constant. Note that the constant induced voltage ellipse and the constant torque curve are not uniquely determined based on a motor parameter such as reactance, and change from moment to moment depending on the operation state of the motor.

<Configuration of Motor Control Device>

Figure 2:
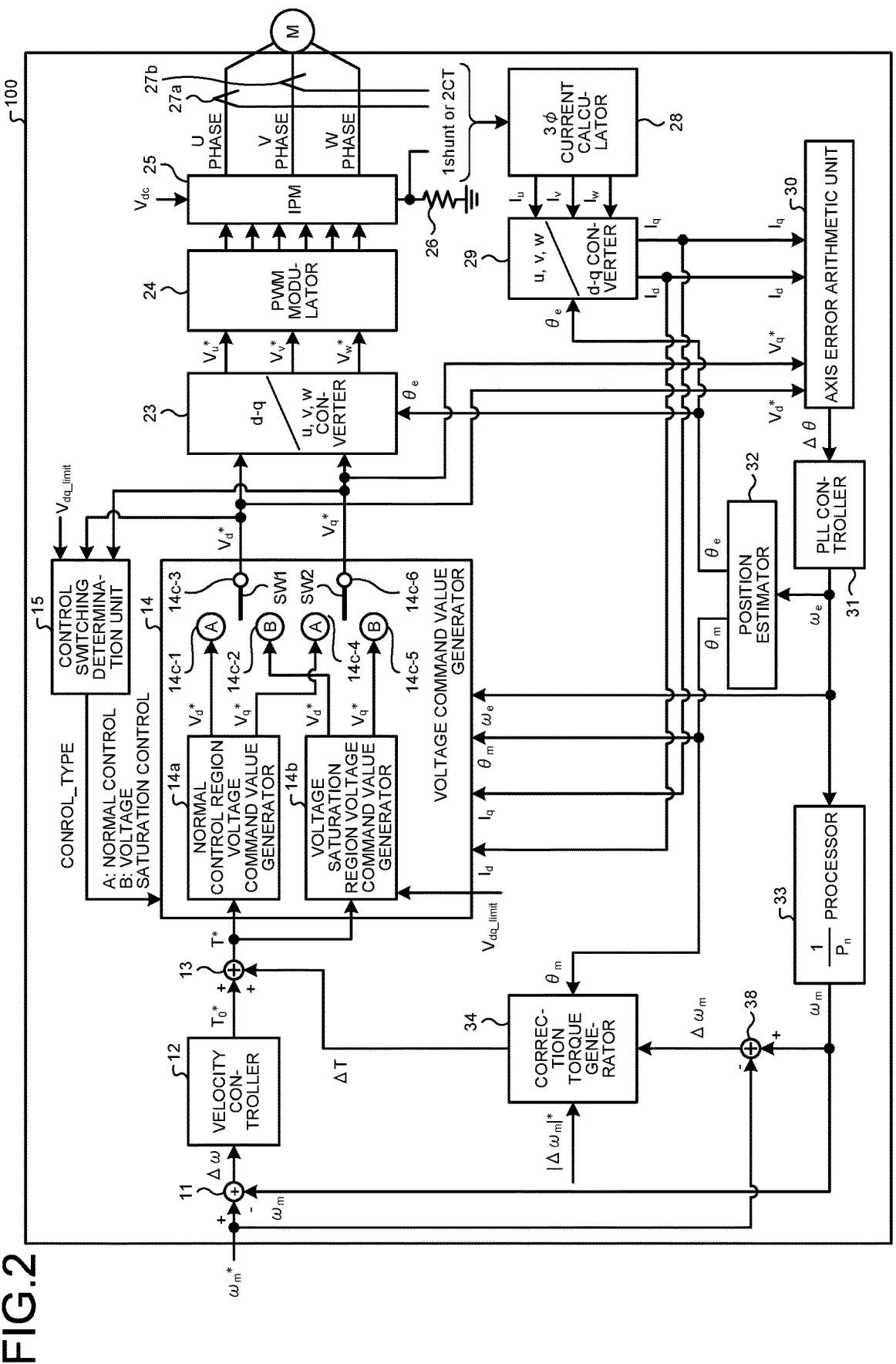
FIG. 2 illustrates a configuration example of the motor control device according to the first embodiment of the present disclosure.

FIG. 2 illustrates a configuration example of the motor control device according to the first embodiment of the present disclosure. In FIG. 2, a motor control device 100 includes subtractors 11 and 38, a velocity controller 12, an adder 13, a voltage command value generator 14, a control switching determination unit 15, a d-q/u, v, w converter 23, a pulse width modulation (PWM) modulator 24, and an intelligent power module (IPM) 25. The IPM 25 is connected to a motor M. One example of the motor M includes a PMSM.

Furthermore, the motor control device 100 includes a shunt resistor 26, current sensors 27a and 27b, and a 3φ current calculator 28. Note that the motor control device 100 only needs to include any one of the shunt resistor 26 and the current sensors 27a and 27b.

Furthermore, the motor control device 100 includes a u, v, w/d-q converter 29, an axis error arithmetic unit 30, a phase locked loop (PLL) controller 31, a position estimator 32, a 1/Pn processor 33, and a correction torque generator 34.

The voltage command value generator 14 includes a normal control region voltage command value generator 14a, a voltage saturation region voltage command value generator 14b, a switch SW1, and a switch SW2. The switch SW1 includes contacts 14c-1, 14c-2, and 14c-3. The switch SW2 includes contacts 14c-4, 14c-5, and 14c-6.

The subtractor 11 calculates an angular velocity error Δω by subtracting a mechanical angle estimated angular velocity ωm from a mechanical angular velocity command value ωm*. The mechanical angle estimated angular velocity ωm is a current estimated angular velocity output from the 1/Pn processor 33. The mechanical angular velocity command value ωm* is input from the outside of the motor control device 100 (e.g., higher-level controller) to the motor control device 100. The subtractor 11 outputs the calculated angular velocity error Δω to the velocity controller 12.

The velocity controller 12 generates the average torque command value To* with which the angular velocity error Δω input from the subtractor 11 approaches zero, and outputs the generated average torque command value To* to the adder 13.

The adder 13 calculates the total torque command value T* by adding the average torque command value To* output from the velocity controller 12 and the fluctuating torque command value ΔT output from the correction torque generator 34 together, and outputs the calculated total torque command value T* to the voltage command value generator 14.

The voltage command value generator 14 generates a d-axis voltage command value Vd* and a q-axis voltage command value Vq* based on the total torque command value T* output from the adder 13 in each of the normal control region and the voltage saturation region, and outputs the generated d-axis voltage command value Vd* and q-axis voltage command value Vq*. In the voltage saturation region, the output voltage amplitude Va is saturated in a high-speed rotation region of the motor M, and the weak magnetic flux control is performed. The normal control region is a region other than the voltage saturation region, in which the motor M is controlled by varying output voltage. In the normal control region, maximum torque/current control and the like is performed.

When the control switching determination unit 15 outputs a control signal CONTROL_TYPE: A (normal control), the voltage command value generator 14 connects the contact 14c-1 and the contact 14c-3 of the switch SW1, and connects the contact 14c-4 and the contact 14c-6 of the switch SW2 to output the d-axis voltage command value Vd* and the q-axis voltage command value Vq* generated by the normal control region voltage command value generator 14a to the d-q/u, v, w converter 23. In contrast, when the control switching determination unit 15 outputs a control signal CONTROL_TYPE: B (voltage saturation control), the voltage command value generator 14 connects the contact 14c-2 and the contact 14c-3 of the switch SW1, and connects the contact 14c-5 and the contact 14c-6 of the switch SW2 to output the d-axis voltage command value Vd* and the q-axis voltage command value Vq* generated by the voltage saturation region voltage command value generator 14b to the d-q/u, v, w converter 23.

The control switching determination unit 15 determines whether the current control region of the motor M is the normal control region or the voltage saturation region based on an output voltage limit value Vdq_limit, the d-axis voltage command value Vd*, and the q-axis voltage command value Vq*. Then, when determining that the current control region of the motor M is the normal control region, the control switching determination unit 15 outputs the control signal CONTROL_TYPE: A (normal control) to the voltage command value generator 14. When determining that the current control region of the motor M is the voltage saturation region, the control switching determination unit 15 outputs the control signal CONTROL_TYPE: B (voltage saturation control) to the voltage command value generator 14. The output voltage limit value Vdq_limit is obtained by converting a DC voltage Vdc supplied from the outside of the IPM 25 (e.g., power supply converter (not illustrated)) to the IPM 25 into a voltage value in a dq rotation coordinate axis system, which is a control system.

The d-q/u, v, w converter 23 converts two phases of the d-axis voltage command value Vd* and the q-axis voltage command value Vq* output by the voltage command value generator 14 into three phases of a U-phase output voltage command value Vu*, a V-phase output voltage command value Vv*, and a W-phase output voltage command value Vw* based on an electrical angle phase (dq-axis phase) θe, which is a current rotor position output by the position estimator 32. Then, the d-q/u, v, w converter 23 outputs the U-phase output voltage command value Vu*, the V-phase output voltage command value Vv*, and the W-phase output voltage command value Vw* to the PWM modulator 24.

The PWM modulator 24 generates a six-phase PWM signal based on the U-phase output voltage command value Vu*, the V-phase output voltage command value Vv*, the W-phase output voltage command value Vw*, and a PWM carrier signal, and outputs the generated six-phase PWM signal to the IPM 25.

The IPM 25 generates AC voltages to be applied to each of a U phase, a V phase, and a W phase of the motor M by converting the DC voltage Vdc supplied from the outside of the IPM 25 based on the six-phase PWM signal output by the PWM modulator 24, and applies each of the AC voltages to the U phase, the V phase, and the W phase of the motor M.

When a bus current is detected by a one-shunt method using the shunt resistor 26, the 3φ current calculator 28 calculates a U-phase current value Iu, a V-phase current value Iv, and a W-phase current value Iw of the motor M based on six-phase PWM switching information output by the PWM modulator 24 and the detected bus current. Alternatively, when the current sensors 27a and 27b detect a U-phase current and a V-phase current, the 3φ current calculator 28 calculates the remaining W-phase current value Iw based on Kirchhoff's law of "Iu+Iv+Iw=0". The 3φ current calculator 28 outputs the calculated phase current values Iu, Iv, and Iw of the respective phases to the u, v, w/d-q converter 29.

The u, v, w/d-q converter 29 converts the three phases of the U-phase current value Iu, the V-phase current value Iv, and the W-phase current value Iw output by the 3φ current calculator 28 into two phases of a d-axis current Id and a q-axis current Iq based on an electrical angle phase θe indicating the current rotor position output by the position estimator 32. Then, the u, v, w/d-q converter 29 outputs the d-axis current Id and the q-axis current Iq to the voltage command value generator 14 and the axis error arithmetic unit 30.

The axis error arithmetic unit 30 calculates an axis error Δθ (difference between estimated rotation axis and actual rotation axis) by using the d-axis voltage command value Vd* and the q-axis voltage command value Vq* output by the voltage command value generator 14 and the d-axis current Id and the q-axis current Iq output by the u, v, w/d-q converter 29. Then, the axis error arithmetic unit 30 outputs the calculated axis error Δθ to the PLL controller 31.

The PLL controller 31 calculates the electrical angle estimated angular velocity ωe, which is a current estimated angular velocity, based on the axis error Δθ output by the axis error arithmetic unit 30, and outputs the calculated electrical angle estimated angular velocity ωe to the position estimator 32 and the 1/Pn processor 33.

The position estimator 32 estimates the electrical angle phase θe and a mechanical angle phase θm based on the electrical angle estimated angular velocity ωe output by the PLL controller 31. Then, the position estimator 32 outputs the estimated electrical angle phase θe to the d-q/u, v, w converter 23 and the u, v, w/d-q converter 29, and outputs the estimated mechanical angle phase θm to the voltage command value generator 14 and the correction torque generator 34.

The 1/Pn processor 33 calculates the mechanical angle estimated angular velocity ωm by dividing the electrical angle estimated angular velocity ωe output by the PLL controller 31 by pole pairs Pn of the motor M, and outputs the calculated mechanical angle estimated angular velocity ωm to the subtractors 11 and 38.

The subtractor 38 calculates mechanical angle estimated angular velocity fluctuation Δωm by subtracting the mechanical angular velocity command value ωm* from the mechanical angle estimated angular velocity ωm output by the 1/Pn processor 33, and outputs the calculated mechanical angle estimated angular velocity fluctuation Δωm to the correction torque generator 34.

The correction torque generator 34 generates the fluctuating torque command value ΔT based on a velocity fluctuation allowable value |Δωm|*, the mechanical angle estimated angular velocity fluctuation Δωm, and the mechanical angle phase θm. The velocity fluctuation allowable value |Δωm|* is a velocity fluctuation range in which vibration of the motor M is allowable. The mechanical angle estimated angular velocity fluctuation Δωm is output by the subtractor 38. The mechanical angle phase θm is output by the position estimator 32. The fluctuating torque command value ΔT inhibits the mechanical angle estimated angular velocity fluctuation Δωm, which is periodic velocity fluctuation, to equal to or less than the velocity fluctuation allowable value |Δωm|*. The correction torque generator 34 outputs the generated fluctuating torque command value ΔT to the adder 13. Note that the velocity fluctuation allowable value |Δωm|* is stored in the motor control device 100. Furthermore, the mechanical angle estimated angular velocity fluctuation (velocity fluctuation) Δωm is different from the value of the above-described angular velocity error Δω only in positive and negative signs.

<Configuration of Control Switching Determination Unit>

Figure 3:
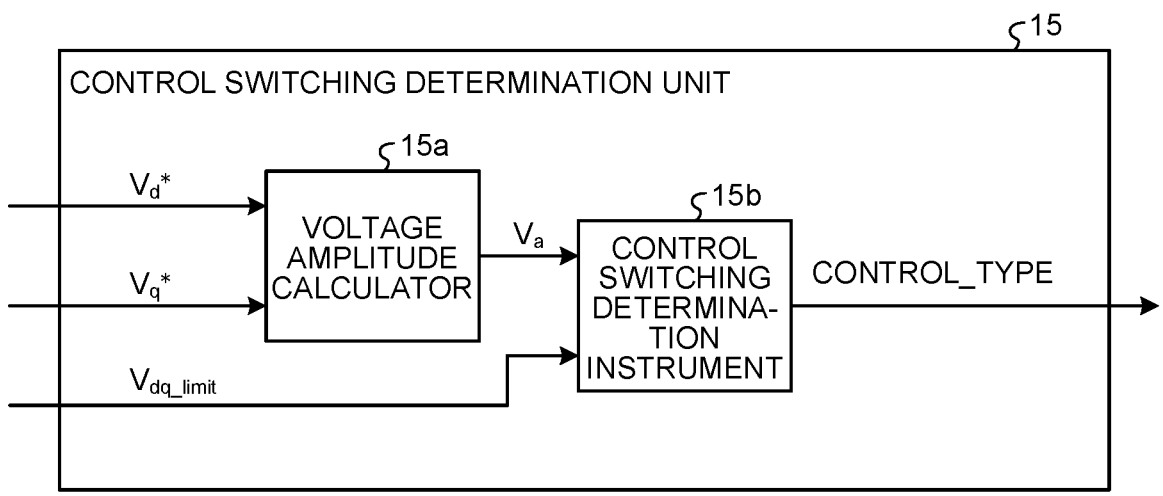
FIG. 3 illustrates a configuration example of a control switching determination unit according to the first embodiment of the present disclosure.

FIG. 3 illustrates a configuration example of the control switching determination unit according to the first embodiment of the present disclosure. In FIG. 3, the control switching determination unit 15 includes a voltage amplitude calculator 15a and a control switching determination instrument 15b. The control switching determination unit 15 determines whether the current control region of the motor is the normal control region or the voltage saturation region as follows.

The voltage amplitude calculator 15a calculates the output voltage amplitude Va in accordance with Expression (1) based on the d-axis voltage command value Vd* and the q-axis voltage command value Vq* output by the voltage command value generator 14.

$$V_a = \sqrt{(V_d^*)^2 + (V_q^*)^2} \quad (1)$$

The control switching determination instrument 15b compares the peak value of the output voltage amplitude Va calculated by the voltage amplitude calculator 15a with the output voltage limit value Vdq_limit.

When the peak value of the output voltage amplitude Va is less than the output voltage limit value Vdq_limit, the control switching determination instrument 15b determines that the current control region of the motor M is the normal control region, and outputs the control signal CONTROL_TYPE: A to the voltage command value generator 14.

In contrast, when the peak value of the output voltage amplitude Va is equal to or more than the output voltage limit value Vdq_limit, the control switching determination instrument 15b determines that the current control region of the motor M is the voltage saturation region, and outputs the control signal CONTROL_TYPE: B to the voltage command value generator 14.

<Configuration of Correction Torque Generator>

Figure 4:
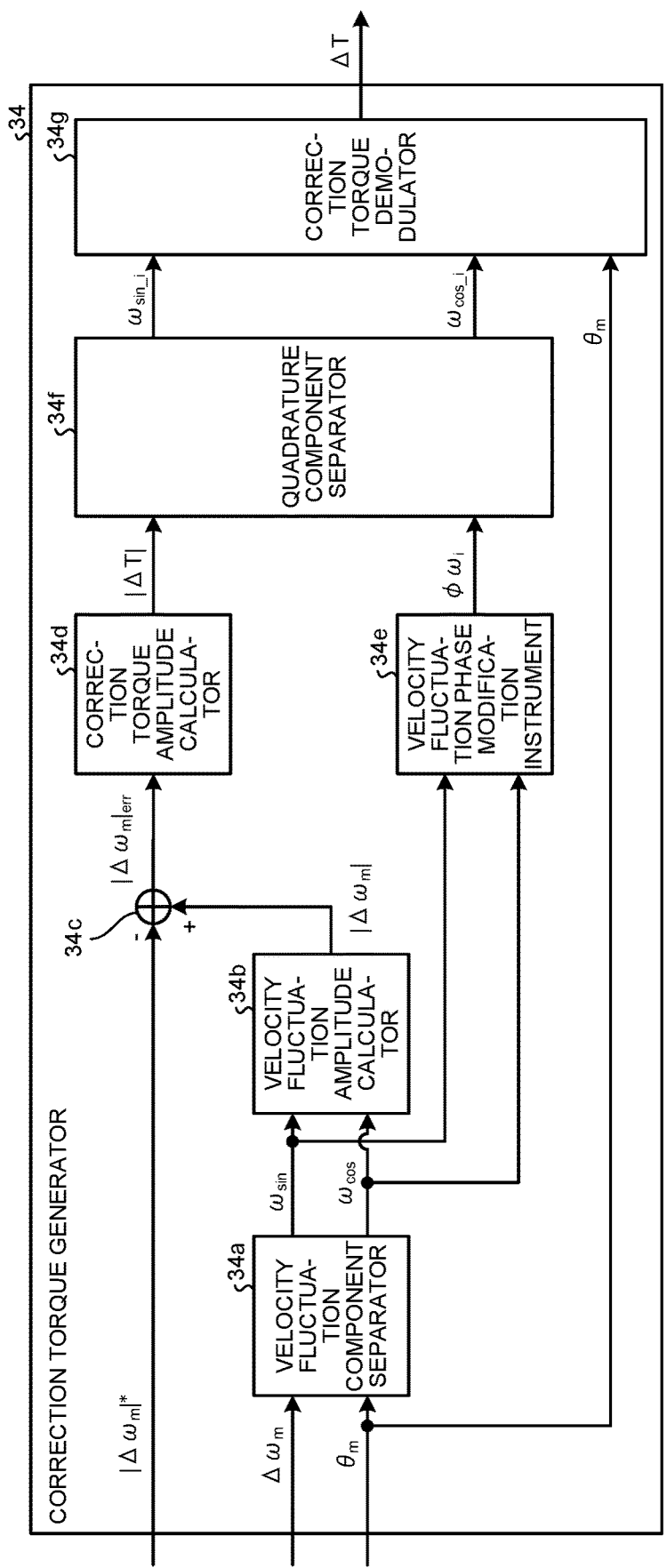
FIG. 4 illustrates a configuration example of a correction torque generator according to the first embodiment of the present disclosure.

FIG. 4 illustrates a configuration example of the correction torque generator according to the first embodiment of the present disclosure. In FIG. 4, the correction torque generator 34 includes a velocity fluctuation component separator 34a, a velocity fluctuation amplitude calculator 34b, a subtractor 34c, a correction torque amplitude calculator 34d, a velocity fluctuation phase modification instrument 34e, a quadrature component separator 34f, and a correction torque demodulator 34g.

The correction torque generator 34 adjusts the amplitude (correction torque amplitude |ΔT|) and the phase of the fluctuating torque command value (correction torque) ΔT for each mechanical angle cycle such that a velocity fluctuation amplitude |Δωm| falls within the velocity fluctuation allowable value |Δωm|* within a range in which the vibration of the motor M does not cause a problem in actual use.

The velocity fluctuation component separator 34a separates the mechanical angle estimated angular velocity fluctuation Δωm into two Fourier coefficients ω sin (sin component) and ω cos (cos component), which are fundamental wave components of Δωm, in accordance with Expressions (2.1) and (2.2). A harmonic component of the mechanical angle estimated angular velocity fluctuation Δωm is excluded by calculating a Fourier coefficient of the fundamental wave component of the mechanical angle estimated angular velocity fluctuation Δωm for each mechanical angle cycle, which allows the fundamental wave component of the mechanical angle estimated angular velocity fluctuation Δωm to be accurately extracted. Here, ω sin and ω cos are values updated for each mechanical angle cycle.

$$\omega_{sin} = \frac{1}{\pi} \int_0^{2\pi} \Delta\omega_m \cdot \sin(\theta_m) d\theta_m \quad (2.1)$$

$$\omega_{cos} = \frac{1}{\pi} \int_0^{2\pi} \Delta\omega_m \cdot \cos(\theta_m) d\theta_m \quad (2.2)$$

The velocity fluctuation amplitude calculator 34b calculates the velocity fluctuation amplitude |Δωm| in accordance with Expression (3) based on the Fourier coefficients ω sin and ω cos. Since ω sin and ω cos are values updated for each mechanical angle cycle, the velocity fluctuation amplitude |Δωm| is also updated for each mechanical angle cycle.

$$|\Delta\omega_m| = \sqrt{(\omega_{sin})^2 + (\omega_{cos})^2} \quad (3)$$

The subtractor 34c calculates a velocity fluctuation error |Δωm|err by subtracting the velocity fluctuation allowable value |Δωm|* from the velocity fluctuation amplitude |ΔΩm| output from the velocity fluctuation amplitude calculator 34b. The velocity fluctuation allowable value |Δωm|* defines the velocity fluctuation amplitude |Δωm| in a range in which the vibration of the motor M is allowable.

The correction torque amplitude calculator 34d adjusts the correction torque amplitude |ΔT| for each mechanical angle cycle in accordance with an error between the velocity fluctuation amplitude |Δωm| and the velocity fluctuation allowable value |Δωm|*. For example, the correction torque amplitude calculator 34d calculates the correction torque amplitude |ΔT| by multiplying the velocity fluctuation error |Δωm|err, which is an error between the velocity fluctuation amplitude |Δωm| and the velocity fluctuation allowable value |Δωm|*, by a correction gain k and adding the multiplication result and |ΔT|_old together in accordance with Expression (4). In Expression (4), |ΔT|_old is the correction torque amplitude |ΔT| in the previous mechanical angle cycle. Appropriately setting the correction gain k can inhibit hunting of velocity fluctuation |Δω| at the boundary of the velocity fluctuation allowable value |Δωm|* and occurrence of vibration caused by the velocity fluctuation |Δω| made larger than the velocity fluctuation allowable value |Δωm|* by sudden load torque change.

$$|\Delta T| = k \cdot (|\Delta\omega_m| - |\Delta\omega_m|^*) + |\Delta T|_{old} \quad (4)$$

The velocity fluctuation phase modification instrument 34e modifies the phase of the mechanical angle estimated angular velocity fluctuation Δωm acquired for each mechanical angle cycle. For example, the velocity fluctuation phase modification instrument 34e multiplies each of the Fourier coefficients ω sin and ω cos by the correction gain k in accordance with Expressions (5.1) and (5.2), and adds ω sin_i_old and ω cos_i_old to each of the multiplication results. In Expression (5.1), ω sin_i_old is ω sin_i_in the previous mechanical angle cycle. In Expression (5.2), ω cos_i_old is ω cos_i_in the previous mechanical angle cycle. Then, the velocity fluctuation phase modification instrument 34e calculates an arctangent of ω sin_i and ω cos_i as a velocity fluctuation modification phase φωi in accordance with Expression (5.3). The velocity fluctuation modification phase φωi serves as a reference of a phase at the time when torque control is performed. A phase delayed by π/2 with respect to the reference is a phase of the fluctuating torque command value ΔT (correction torque phase).

$$\omega_{sin\_i} = \omega_{sin} \cdot k + \omega_{sin\_i\_old} \quad (5.1)$$

$$\omega_{cos\_i} = \omega_{cos} \cdot k + \omega_{cos\_i\_old} \quad (5.2)$$

$$\phi_{\omega i} = \tan^{-1}\left(\frac{\omega_{cos\_i}}{\omega_{sin\_i}}\right) \quad (5.3)$$

The quadrature component separator 34f calculates the sin component (ω sin_i) and the cos component (ω cos_i) of the velocity fluctuation modification phase φωi in accordance with Expressions (6.1) and (6.2) based on the correction torque amplitude |ΔT| and the velocity fluctuation modification phase φωi. The processing also has a role of preventing divergence at the time of phase modification by the calculations of Expressions (5.1) and (5.2).

$$\omega_{sin\_i} = |\Delta T| \cdot \cos(\phi_{\omega i}) \quad (6.1)$$

$$\omega_{cos\_i} = |\Delta T| \cdot \sin(\phi_{\omega i}) \quad (6.2)$$

The correction torque demodulator 34g calculates the fluctuating torque command value ΔT in accordance with Expressions (7.1) and (7.2) based on the sin component (ω sin_i) and the cos component (ω cos_i) of the velocity fluctuation modification phase φωi. The velocity fluctuation modification phase φωi is converted into the correction torque phase, which is delayed by π/2, by the processing, and an instantaneous value of the fluctuating torque command value ΔT at the mechanical angle phase θm is generated.

$$\Delta T = \omega_{sin\_i} \cdot \sin\left(\theta_m - \frac{\pi}{2}\right) + \omega_{cos\_i} \cdot \cos\left(\theta_m - \frac{\pi}{2}\right) \quad (7.1)$$

$$= \omega_{cos\_i} \cdot \sin(\theta_m) - \omega_{sin\_i} \cdot \cos(\theta_m) \quad (7.2)$$

Note that the correction torque demodulator 34g may calculate the instantaneous value of the fluctuating torque command value ΔT in accordance with Expression (8) instead of Expressions (7.1) and (7.2).

$$\Delta T = |\Delta T| \cdot \sin\left(\theta_m + \phi_{\omega i} - \frac{\pi}{2}\right) \quad (8)$$

Then, the adder 13 calculates the total torque command value T* by adding the fluctuating torque command value ΔT to the average torque command value To* output by the velocity controller 12 in accordance with Expression (9).

$$T^* = T_0^* + \Delta T \quad (9)$$

<Configuration of Voltage Saturation Region Voltage Command Value Generator>

Figure 5:
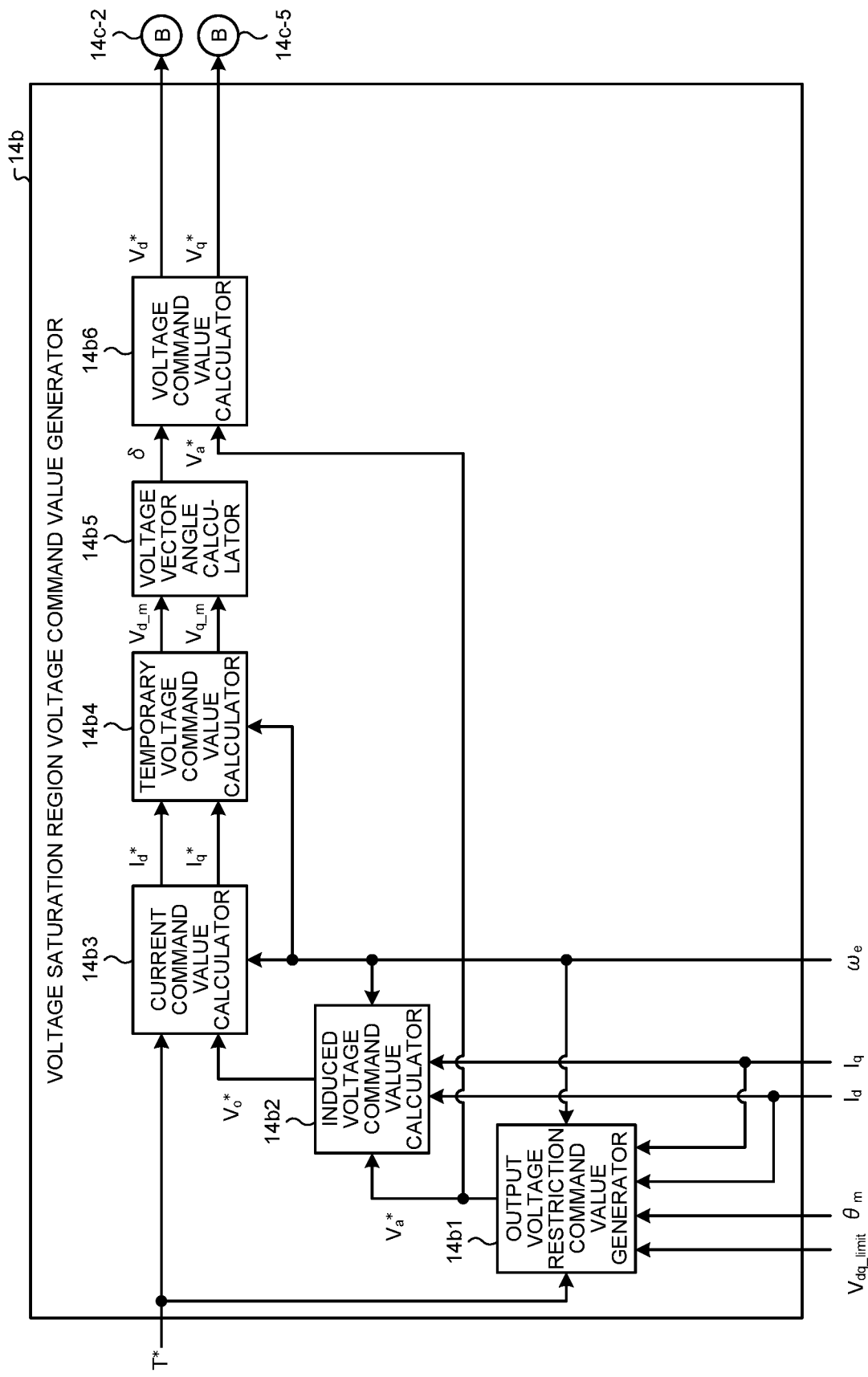
FIG. 5 illustrates a configuration example of a voltage saturation region voltage command value generator according to the first embodiment of the present disclosure.

FIG. 5 illustrates a configuration example of the voltage saturation region voltage command value generator according to the first embodiment of the present disclosure. In FIG. 5, the voltage saturation region voltage command value generator 14b includes an output voltage restriction command value generator 14b1, an induced voltage command value calculator 14b2, a current command value calculator 14b3, a temporary voltage command value calculator 14b4, a voltage vector angle calculator 14b5, and a voltage command value calculator 14b6.

Figure 6:
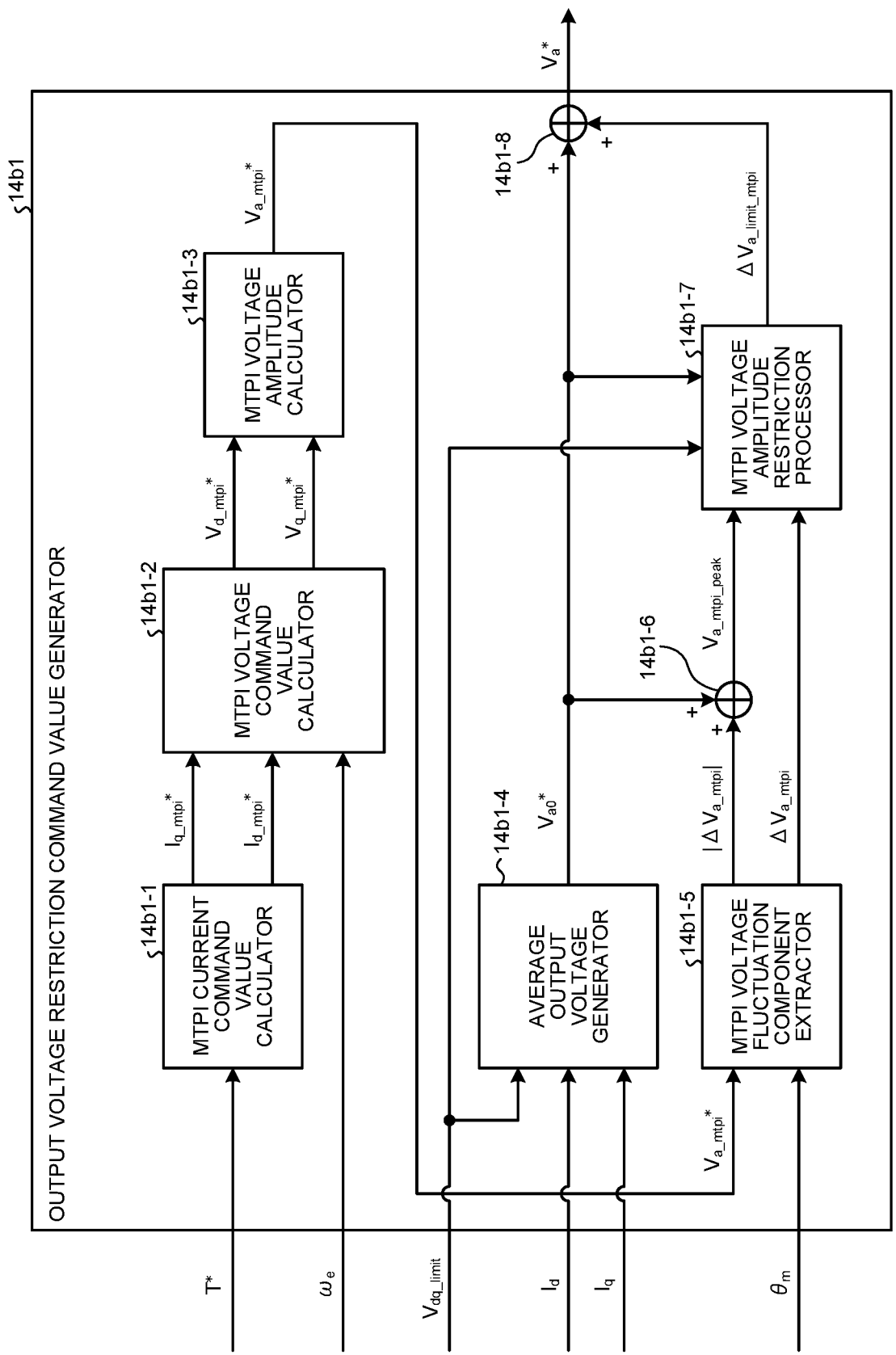
FIG. 6 illustrates a configuration example of an output voltage restriction command value generator according to the first embodiment of the present disclosure.

FIG. 6 illustrates a configuration example of the output voltage restriction command value generator according to the first embodiment of the present disclosure. In FIG. 6, the output voltage restriction command value generator 14b1 includes an MTPI current command value calculator 14b1-1, an MTPI voltage command value calculator 14b1-2, an MTPI voltage amplitude calculator 14b1-3, an average output voltage generator 14b1-4, an MTPI voltage fluctuation component extractor 14b1-5, adders 14b1-6 and 14b1-8, and an MTPI voltage amplitude restriction processor 14b1-7.

The output voltage restriction command value generator 14b1 generates an output voltage restriction command value Va* based on the total torque command value T*, the electrical angle estimated angular velocity ωe, the output voltage limit value Vdq_limit, the d-axis current Id, the q-axis current Iq, and the mechanical angle phase θm. The output voltage restriction command value Va* is a voltage for adjusting a fluctuation amplitude of an output voltage within a range up to the output voltage limit value Vdq_limit and matching a fluctuation phase of the output voltage with a fluctuation phase of the output voltage in the normal control region (MTPI control region).

In FIG. 6, the MTPI current command value calculator 14b1-1 calculates an MTPI assumed d-axis current command value Id_mtpi* and an MTPI assumed q-axis current command value Iq_mtpi*, which are points of intersection of the constant torque curve and an MTPI curve (maximum torque/current control curve). The constant torque curve is a current locus in which the total torque command value T* is constant. A point of intersection of the constant torque curve and the MTPI curve is calculated by, for example, using a motor torque expression of Expression (10) and Expression (11). Expression (11) is a d-axis current expression on the MTPI curve in the case where the q-axis current is known.

$$T = P_n \cdot \{\Psi_a \cdot I_q + (L_d - L_q) \cdot I_d \cdot I_q\} \quad (10)$$

$$I_d = \frac{\Psi_a}{2 \cdot (L_q - L_d)} - \sqrt{\frac{\Psi_a^2}{4 \cdot (L_q - L_d)^2} + I_q^2} \quad (11)$$

A quartic equation related to the q-axis current Iq can be obtained as illustrated in Expression (12) by erasing the d-axis current Id from the Expressions (10) and (11).

$$(L_d - L_q)^2 \cdot I_q^4 + \Psi_a \cdot \frac{T}{P_n} \cdot I_q - \left(\frac{T}{P_n}\right)^2 = 0 \quad (12)$$

A solution corresponding to the MTPI assumed q-axis current command value Iq_mtpi* at the point of intersection of the constant torque curve of the total torque command value T* and the MTPI curve can be derived by using, for example, Newton method to the quartic equation in Expression (12) as a solution of the quartic equation in Expression (12).

The MTPI current command value calculator 14b1-1 calculates the MTPI assumed d-axis current command value Id_mtpi* in accordance with the d-axis current expression in Expression (11) based on the MTPI assumed q-axis current command value Iq_mtpi*, which is a solution of Expression (12).

The MTPI voltage command value calculator 14b1-2 calculates an MTPI assumed d-axis voltage Vd_mtpi* and an MTPI assumed q-axis voltage Vq_mtpi* in accordance with PMSM voltage equations in Expressions (13.1) and (13.2) based on the MTPI assumed d-axis current command value Id_mtpi*, the MTPI assumed q-axis current command value Iq_mtpi*, and the electrical angle estimated angular velocity ωe. Note that "p" in Expressions (13.1) and (13.2) is a differential operator.

$$V_{d\_mtpi}* = R \cdot I_{d\_mtpi}* + p \cdot L_q \cdot I_d - \omega_e \cdot L_q \cdot I_{q\_mtpi}* \quad (13.1)$$

$$V_{q\_mtpi}* = R \cdot I_{q\_mtpi}* + p \cdot L_q \cdot I_q + \omega_e \cdot L_d \cdot I_{d\_mtpi}* + \omega_e \cdot \Psi_a \quad (13.2)$$

Note that, in Expressions (13.1) and (13.2), voltage drops "p·Ld·Id" and "p·Lq·Iq" (p-term voltage) in inductance accompanying current change due to torque control are considered. "Ld" represents a d-axis inductance of the motor M, and "Lq" represents a q-axis inductance of the motor M.

Here, the p-term voltage is indicated by using the time derivative of current change. If the change amount of detected current is used as a differential value as it is, however, the MTPI assumed d-axis voltage Vd_mtpi* and an MTPI assumed q-axis voltage Vq_mtpi* sensitively react to current noise. Therefore, the differential value is generated, for example, as follows based on current fundamental wave fluctuation.

In order to describe the generation of the p-term voltage, first, fluctuation components ΔIda and ΔIqa of the d-axis current Id and the q-axis current Iq are defined as in Expressions (14.1) and (14.2).

$$\Delta I_{da} = I_{da} \cdot \sin(\theta_m + \phi_d) \quad (14.1)$$

$$\Delta I_{qa} = I_{qa} \cdot \sin(\theta_m + \phi_q) \quad (14.2)$$

Here, when one cycle fluctuation occurs during one mechanical angle rotation, "Ida" and "φd" in Expression (14.1) indicate the fluctuation amplitude and an initial phase of ΔIda, "Iqa" and "φq" in Expression (14.2) indicate the fluctuation amplitude and an initial phase of ΔIqa, and "θm" in Expressions (14.1) and (14.2) indicate the instantaneous value of the mechanical angle phase.

Therefore, the p-term voltage generated by the current fundamental wave fluctuation is expressed as in Expressions (15.1) and (15.2). That is, the differential value (p-term voltage) can be generated by advancing the phases of d-axis current fluctuation and q-axis current fluctuation by π/2 and multiplying the d-axis current fluctuation and the q-axis current fluctuation whose phases have been advanced by π/2 by the mechanical angle estimated angular velocity ωm.

$$p \cdot L_d \cdot I_d = L_d \cdot \frac{dI_d}{dt} = \quad (15.1)$$

$$L_d \cdot \frac{d\theta_m}{dt} \cdot \frac{dI_d}{d\theta_m} = L_d \cdot \omega_m \cdot \frac{d}{d\theta_m}(\Delta I_{da}) = \omega_m \cdot L_d \cdot I_{da} \cdot \cos(\theta_m + \phi_d)$$

$$p \cdot L_q \cdot I_q = L_q \cdot \frac{dI_q}{dt} = \quad (15.2)$$

$$L_q \cdot \frac{d\theta_m}{dt} \cdot \frac{dI_q}{d\theta_m} = L_q \cdot \omega_m \cdot \frac{d}{d\theta_m}(\Delta I_{qa}) = \omega_m \cdot L_q \cdot I_{qa} \cdot \cos(\theta_m + \phi_q)$$

The MTPI voltage amplitude calculator 14b1-3 calculates an MTPI estimated output voltage Va_mtpi* in accordance with Expression (16) based on the MTPI assumed d-axis voltage Vd_mtpi* and the MTPI assumed q-axis voltage Vq_mtpi*.

$$V_{a\_mtpi}* = \sqrt{(V_{d\_mtpi}*)^2 + (V_{q\_mtpi}*)^2} \quad (16)$$

The average output voltage generator 14b1-4 outputs an average output voltage command value Va0* adjusted such that the average value of each of the d-axis current Id and the q-axis current Iq which fluctuate for each rotation of a rotor of the motor M traces the MTPI curve (maximum torque/current control curve). For example, the average output voltage generator 14b1-4 calculates a d-axis current Idt on the MTPI curve from the current q-axis current Iq, and adjusts the average output voltage command value Va0* by PI control and the like such that there is no error between the calculated d-axis current Idt and the current d-axis current Id. The average output voltage generator 14b1-4 calculates the average output voltage command value Va0* in accordance with, for example, Expressions (17.1) and (17.2). Furthermore, when the average output voltage command value Va0* exceeds the output voltage limit value Vdq_limit, the average output voltage generator 14b1-4 restricts the average output voltage command value Va0* to the output voltage limit value Vdq_limit in accordance with Expression (18). Restricting the average output voltage command value Va0* to the output voltage limit value Vdq_limit leads to the weak magnetic flux control. Here, "Ψa" represents an interlinkage magnetic flux of the motor M.

$$I_{dt} = \frac{\psi_a}{2(L_q - L_d)} - \sqrt{\frac{\psi_a^2}{4(L_q - L_d)^2} + I_q^2} \quad (17.1)$$

$$V_a0* = K_p(I_{dt} - I_d) + K_i \int (I_{dt} - I_d)dt \quad (17.2)$$

$$V_a0* > V_{dq\_limit} \Rightarrow V_a0* = V_{dq\_limit} \quad (18)$$

The MTPI voltage fluctuation component extractor 14b1-5 calculates a fluctuation amplitude |ΔVa_mtpi| of the MTPI estimated output voltage Va_mtpi* and an instantaneous value ΔVa_mtpi as follows, for example.

First, the MTPI voltage fluctuation component extractor 14b1-5 first separates the fundamental wave component of the MTPI estimated output voltage Va_mtpi* into a Fourier coefficient Va_mtpi_sin, which is a sin component, and Va_mtpi_cos, which is a cos component, in accordance with Expressions (19.1) and (19.2). The MTPI voltage fluctuation component extractor 14b1-5 can extract the fundamental wave component of the MTPI estimated output voltage Va_mtpi* from which a harmonic component is removed by calculating the Fourier coefficient of the fundamental wave component of the MTPI estimated output voltage Va_mtpi* for each mechanical angle cycle.

$$V_{a\_mtpi\_sin} = \frac{1}{\pi}\int_0^{2\pi} V_{a\_mtpi}* \cdot \sin(\theta_m)d\theta_m \quad (19.1)$$

$$V_{a\_mtpi\_cos} = \frac{1}{\pi}\int_0^{2\pi} V_{a\_mtpi}* \cdot \cos(\theta_m)d\theta_m \quad (19.2)$$

Next, the MTPI voltage fluctuation component extractor 14b1-5 calculates an amplitude |ΔVa_mtpi| of the fundamental wave component of the MTPI estimated output voltage Va_mtpi* in accordance with Expression (20) based on the Fourier coefficients Va_mtpi_sin and Va_mtpi_cos, which have been calculated in accordance with Expressions (19.1) and (19.2). Note that, since the Fourier coefficients Va_mtpi_sin and Va_mtpi_cos are values updated for each mechanical angle cycle, the amplitude |ΔVa_mtpi| is also updated for each mechanical angle cycle.

$$|\Delta V_{a\_mtpi}| = \sqrt{(V_{a\_mtpi\_sin})^2 + (V_{a\_mtpi\_cos})^2} \quad (20)$$

Then, the MTPI voltage fluctuation component extractor 14b1-5 calculates the instantaneous value ΔVa_mtpi of the fundamental wave component of the MTPI estimated output voltage Va_mtpi* in accordance with Expression (21).

$$\Delta V_{a\_mtpi} = V_{a\_mtpi\_sin} \cdot \sin(\theta_m) + V_{a\_mtpi\_cos} \cdot \cos(\theta_m) \quad (21)$$

The adder 14b1-6 calculates an MTPI estimated output voltage fluctuation peak value Va_mtpi_peak by adding the average output voltage command value Va0* and the amplitude |ΔVa_mtpi| of the fundamental wave component of the MTPI estimated output voltage Va_mtpi* together in accordance with Expression (22).

$$V_{a\_mtpi\_peak} = Va0^* + |\Delta V_{a\_mtpi}| \quad (22)$$

The MTPI voltage amplitude restriction processor 14b1-7 generates a fluctuation output voltage restriction command value ΔVa_limit_mtpi, and outputs the generated fluctuation output voltage restriction command value ΔVa_limit_mtpi. The fluctuation output voltage restriction command value ΔVa_limit_mtpi has been adjusted such that the MTPI estimated output voltage fluctuation peak value Va_mtpi_peak is equal to or less than the output voltage limit value Vdq_limit. The MTPI estimated output voltage fluctuation peak value Va_mtpi_peak is an addition result in the adder 14b1-6.

For example, the MTPI voltage amplitude restriction processor 14b1-7 calculates an amplitude ratio scale of an output voltage fluctuation component by comparing the average output voltage command value Va0*, the MTPI estimated output voltage fluctuation peak value Va_mtpi_peak, and the output voltage limit value Vdq_limit with each other, and generates the fluctuation output voltage restriction command value ΔVa_limit_mtpi by multiplying an MTPI estimated output voltage fluctuation component ΔVa_mtpi by the amplitude ratio scale. In this way, the fluctuation output voltage restriction command value ΔVa_limit_mtpi whose phase matches that of the MTPI estimated output voltage fluctuation component ΔVa_mtpi can be generated.

For example, the MTPI voltage amplitude restriction processor 14b1-7 calculates the amplitude ratio scale of the output voltage fluctuation component in accordance with Expressions (23.1) to (23.3), and generates the fluctuation output voltage restriction command value ΔVa_limit_mtpi in accordance with Expression (23.4) based on the calculated amplitude ratio scale.

[Va0* ≥ Vdq_limit] (23.1)

scale=0

[Va_mtpi_peak ≤ Vdq_limit] (23.2)

scale=1

[Other That Above]

$$\text{scale} = \frac{V_{dq\_limit} - Va0^*}{|\Delta V_{a\_mtpi}|} \quad (23.3)$$

$$\Delta V_{a\_limit\_mtpi} = \text{scale} \times \Delta V_{a\_mtpi} \quad (23.4)$$

The adder 14b1-8 calculates the output voltage restriction command value Va* by adding the average output voltage command value Va0* and the fluctuation output voltage restriction command value ΔVa_limit_mtpi together in accordance with Expression (24). The adder 14b1-8 outputs the calculated output voltage restriction command value Va* to the induced voltage command value calculator 14b2 and the voltage command value calculator 14b6.

$$V_a^* = Va0^* + \Delta V_{a\_limit\_mtpi} \quad (24)$$

In FIG. 5, the induced voltage command value calculator 14b2 calculates an induced voltage command value Vo* based on the output voltage restriction command value Va* in accordance with the motor model expressions in Expressions (25.1) and (25.2) based on the d-axis current Id, the q-axis current Iq, and the electrical angle estimated angular velocity ωe at the current time. Details of the calculation of the induced voltage command value Vo* will be described below.

Voltage equations (d-axis voltage Vd and q-axis voltage Vq) of a PMSM, a theoretical formula of the output voltage amplitude Va, and a theoretical formula of the induced voltage Vo of the motor M are expressed in Expressions (25.1) to (27).

$$V_d = R \cdot I_d + p \cdot L_d \cdot I_d - \omega_e \cdot L_q \cdot I_q \quad (25.1)$$

$$V_q = R \cdot I_q + p \cdot L_q \cdot I_q + \omega_e \cdot L_d \cdot I_d + \omega_e \cdot \Psi_a \quad (25.2)$$

$$V_a = \sqrt{V_d^2 + V_q^2} \quad (26)$$

$$V_o = \omega_e \cdot \sqrt{(L_d \cdot I_d + \Psi_a)^2 + (L_q \cdot I_q)^2} \quad (27)$$

Furthermore, an expression for associating the output voltage restriction command value Va* with the induced voltage command value Vo* is expressed in Expression (28) from Expressions (25.1) to (27). Therefore, the induced voltage command value calculator 14b2 calculates the induced voltage command value Vo* in accordance with Expression (28), and outputs the calculated induced voltage command value Vo* to the current command value calculator 14b3.

$$V_o^* = \sqrt{V_a^{*2} - (R \cdot I_d + p \cdot L_d \cdot I_d)^2 - 2 \cdot (R \cdot I_d + p \cdot L_d \cdot I_d) \cdot (-\omega_e \cdot L_q \cdot I_q) - (R \cdot I_q + p \cdot L_q \cdot I_q)^2 - 2 \cdot (R \cdot I_q + p \cdot L_q \cdot I_q) \cdot (\omega_e \cdot L_d \cdot I_d + \omega_e \cdot \Psi_a)} \quad (28)$$

The current command value calculator 14b3 calculates the q-axis current command value Iq* and the d-axis current command value Id* based on a point of intersection of a constant torque curve and a constant induced voltage ellipse (see FIG. 1B). The constant torque curve is a current locus in which the total torque command value T* is constant. The constant induced voltage ellipse is a current locus in which an induced voltage command value Vo* and the electrical angle estimated angular velocity ωe are constant. The current command value calculator 14b3 outputs the calculated q-axis current command value Iq* and d-axis current command value Id* to the temporary voltage command value calculator 14b4.

The point of intersection of the constant torque curve and the constant induced voltage ellipse can be calculated by using, for example, the motor torque expression in Expression (29) and an induced voltage expression in Expression (30).

$$T = P_n \cdot \{\Psi_a \cdot I_q + (L_d - L_q) \cdot I_d \cdot I_q\} \quad (29)$$

$$V_o = \omega_e \cdot \sqrt{(L_d \cdot I_d + \Psi_a)^2 + (L_q \cdot I_q)^2} \quad (30)$$

A quartic equation related to the q-axis current Iq can be obtained as illustrated in Expression (31) by erasing the d-axis current Id from the Expressions (29) and (30). Note, however, that, in Expression (31), "ΔL=Ld–Lq" holds.

$$(\Delta L)^2 \cdot I_q^4 + \left\{\Psi_a^2 - \left(\frac{V_o \cdot \Delta L}{\omega_e \cdot L_q}\right)^2\right\} \cdot I_q^2 - 2 \cdot \Psi_a \cdot \frac{T \cdot L_d}{P_n \cdot L_q} \cdot I_q + \left(\frac{T \cdot L_d}{P_n \cdot L_q}\right)^2 = 0 \quad (31)$$

A solution corresponding to the q-axis current command value Iq* at the point of intersection of the constant torque curve and the constant induced voltage ellipse can be derived by using, for example, Newton method to the quartic equation in Expression (31) as a solution of the quartic equation in Expression (31) (see FIG. 1B). The constant torque curve is a current locus in which the total torque command value T* is constant. The constant induced voltage ellipse is a current locus in which the induced voltage Vo and the electrical angle estimated angular velocity ωe are constant.

After calculating the q-axis current command value Iq*, the current command value calculator 14b3 calculates the d-axis current command value Id* based on the q-axis current command value Iq* in accordance with Expression (32) obtained by transforming the induced voltage expression in Expression (30) into the d-axis current expression.

$$I_d = \frac{\pm\sqrt{\left(\frac{V_o}{\omega_e}\right)^2 - (L_q \cdot I_q)^2} - \Psi_a}{L_d} \quad (32)$$

Here, in Expression (32), whether √ has a positive sign or a negative sign can be determined by calculating torque at the point of intersection of a straight line which is parallel to an Iq-axis and passes through an M-point (–Ψa/Ld, 0) corresponding to the center of the constant induced voltage ellipse (hereinafter, sometimes referred to as "M-point boundary line") and the constant induced voltage ellipse (hereinafter, sometimes referred to as "M-point on-boundary torque T_M") and comparing the M-point on-boundary torque T_M with the total torque command value T*.

Figure 7A:
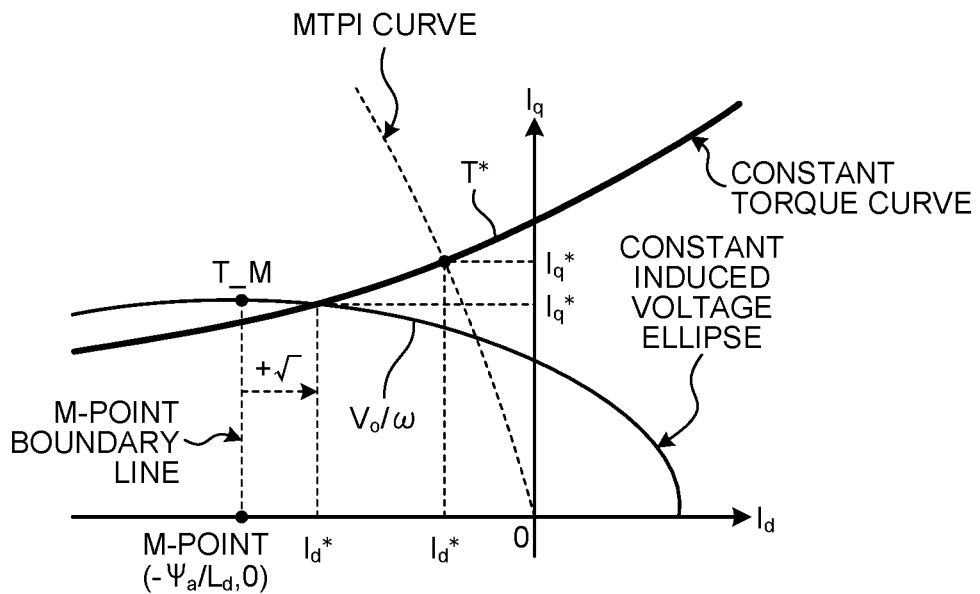
FIG. 7A illustrates an operation example of a current command value calculator according to the first embodiment of the present disclosure.
Figure 7B:
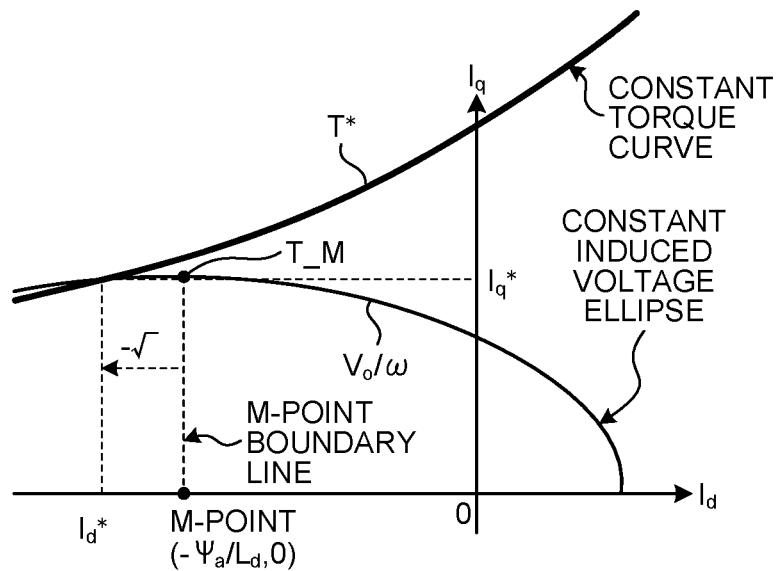
FIG. 7B illustrates an operation example of the current command value calculator according to the first embodiment of the present disclosure.

A procedure of calculating the d-axis current command value Id* and the q-axis current command value Iq* will be described below. FIGS. 7A and 7B illustrate an operation example of the current command value calculator according to the first embodiment of the present disclosure.

The current command value calculator 14b3 first calculates a d-axis current Id_M on the M-point in accordance with Expression (33).

$$I_{d\_M} = -\frac{\Psi_a}{L_d} \quad (33)$$

Next, the current command value calculator 14b3 calculates a q-axis current Iq_M at the point of intersection of the M-point boundary line and the constant induced voltage ellipse. Since the q-axis current Iq_M can be calculated by substituting the d-axis current Id_M on the M-point into Expression (30), the q-axis current Iq_M is calculated in accordance with Expression (34).

$$I_{q\_M} = \frac{V_o}{\omega_e \cdot L_q} \quad (34)$$

Therefore, the current command value calculator 14b3 calculates the M-point on-boundary torque T_M in accordance with Expression (35).

$$T_{\_M} = P_n \cdot \{\Psi_a \cdot I_{q\_M} + (L_d - L_q) \cdot I_{d\_M} \cdot I_{q\_M}\} \quad (35)$$

Then, the current command value calculator 14b3 determines the d-axis current command value Id* in accordance with Expressions (36.1) and (36.2) based on the magnitude relation between the total torque command value T* and the M-point on-boundary torque T_M. Expression (36.1) indicates the d-axis current command value Id* (see FIG. 7A) in the case of "total torque command value T* M-point on-boundary torque T_M". Expression (36.2) indicates the d-axis current command value Id* (see FIG. 7B) in the case of "total torque command value T*>M-point on-boundary torque T_M".

$$[T* \leq T\_M] \quad (36.1)$$

$$I_d^* = \frac{+\sqrt{\left(\frac{V_o^*}{\omega_e}\right)^2 - (L_q \cdot I_q^*)^2} - \Psi_a}{L_d}$$

$$[T* > T\_M] \quad (36.2)$$

$$I_d^* = \frac{-\sqrt{\left(\frac{V_o^*}{\omega_e}\right)^2 - (L_q \cdot I_q^*)^2} - \Psi_a}{L_d}$$

The current command value calculator 14b3 outputs the d-axis current command value Id* and the q-axis current command value Iq* calculated as described above to the temporary voltage command value calculator 14b4.

In FIG. 5, the temporary voltage command value calculator 14b4 calculates a temporary d-axis voltage command value Vd_m and a temporary q-axis voltage command value Vq_m in a feedforward manner in accordance with the motor model expressions in Expressions (37.1) and (37.2) based on the electrical angle estimated angular velocity ωe, the d-axis current command value Id*, and the q-axis current command value Iq*. The temporary voltage command value calculator 14b4 outputs the calculated temporary d-axis voltage command value Vd_m and temporary q-axis voltage command value Vq_m to the voltage vector angle calculator 14b5. Note that windup (saturation phenomenon) that occurs in an integrator such as PI control due to input saturation can be prevented by calculating a temporary voltage command value in a feedforward manner.

$$V_{d\_m} = R \cdot I_d^* + p \cdot L_d \cdot I_d - \omega_e \cdot L_q \cdot I_q^* \quad (37.1)$$

$$V_{q\_m} = R \cdot I_q^* + p \cdot L_q \cdot I_q + \omega_e \cdot (L_d \cdot I_d^* + \Psi_a) \quad (37.2)$$

Note that, in Expressions (37.1) and (37.2), voltage drops "p·Ld·Id" and "p·Lq·Iq" (p-term voltage) in inductance accompanying current change due to torque control are considered.

Figure 8:
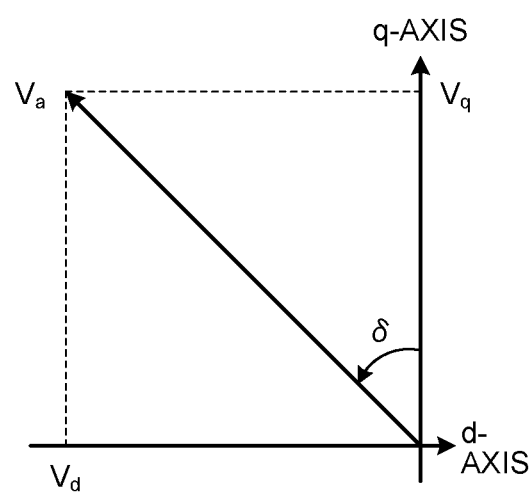
FIG. 8 illustrates an operation example of a voltage vector angle calculator according to the first embodiment of the present disclosure.

The voltage vector angle calculator 14b5 calculates a voltage vector angle δ in accordance with Expression (38) based on the temporary d-axis voltage command value Vd_m and the temporary q-axis voltage command value Vq_m. The voltage vector angle calculator 14b5 outputs the calculated voltage vector angle δ to the voltage command value calculator 14b6. That is, as illustrated in FIG. 8, the voltage vector angle calculator 14b5 calculates an angle formed by an output voltage vector having an amplitude Va calculated as in Expression (1) from the q-axis as the voltage vector angle δ. In this way, the voltage vector angle δ corresponding to the total torque command value T* can be generated by calculation in the voltage saturation region where the output voltage amplitude is restricted to equal to or less than a DC voltage capable of being output by an inverter. Therefore, since damping control can be performed without tuning voltage vector angle fluctuation, damping effects of the motor M can be improved without tuning the voltage vector angle fluctuation. FIG. 8 illustrates an operation example of the voltage vector angle calculator according to the first embodiment of the present disclosure.

$$\delta = A\tan\left(-\frac{V_{d\_m}}{V_{q\_m}}\right) \quad (38)$$

The voltage command value calculator 14b6 calculates the d-axis voltage command value Vd* and the q-axis voltage command value Vq* by performing coordinate conversion from polar coordinates to rectangular coordinates in accordance with Expressions (39.1) and (39.2) based on the voltage vector angle δ and the output voltage restriction command value Va*.

$$V_d^* = -V_a^* \cdot \sin \delta \quad (39.1)$$

$$V_q^* = V_a^* \cdot \cos \delta \quad (39.2)$$

<Operation of MTPI Voltage Amplitude Restriction Processor>

Figure 9:
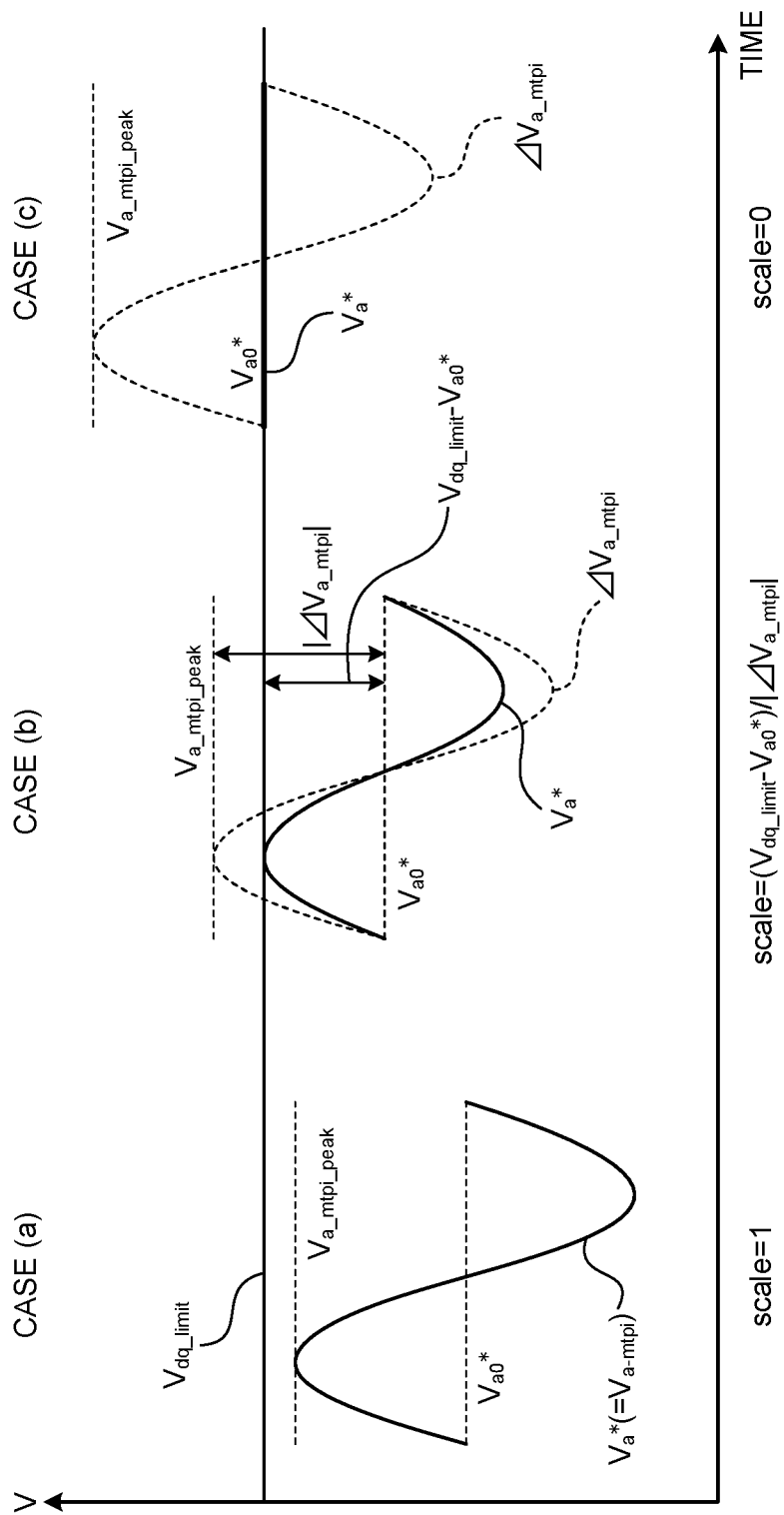
FIG. 9 illustrates an operation example of an MTPI voltage amplitude restriction processor according to the first embodiment of the present disclosure.

FIG. 9 illustrates an operation example of the MTPI voltage amplitude restriction processor according to the first embodiment of the present disclosure.

For example, as illustrated in a case (a) of FIG. 9, when a peak value Va_mtpi_peak of the MTPI estimated output voltage fluctuation component ΔVa_mtpi which fluctuates around the average output voltage command value Va0* is equal to or less than the output voltage limit value Vdq_limit, a condition of Expression (23.2) is satisfied, and thus the MTPI voltage amplitude restriction processor 14b1-7 sets the amplitude ratio scale of the output voltage fluctuation component to "1". Then, the MTPI voltage amplitude restriction processor 14b1-7 sets "scale=1" in Expression (23.4), and outputs the MTPI estimated output voltage fluctuation component ΔVa_mtpi as the fluctuation output voltage restriction command value ΔVa_limit_mtpi as it is. As a result, the output voltage restriction command value Va* matches the MTPI estimated output voltage fluctuation component ΔVa_mtpi.

Furthermore, for example, as illustrated in a case (b) of FIG. 9, when the peak value Va_mtpi_peak of the MTPI estimated output voltage fluctuation component ΔVa_mtpi which fluctuates around the average output voltage command value Va0* exceeds the output voltage limit value Vdq_limit and the average output voltage command value Va0* does not exceed the output voltage limit value Vdq_limit, a condition of Expression (23.3) is satisfied, and thus the MTPI voltage amplitude restriction processor 14b1-7 sets the amplitude ratio scale of the output voltage fluctuation component to "(Vdq_limit−Va0*)/|ΔVa_mtpi|". Then, the MTPI voltage amplitude restriction processor 14b1-7 outputs the fluctuation output voltage restriction command value ΔVa_limit_mtpi for which "scale= (Vdq_limit−Va0*)/|ΔVa_mtpi|" is set in Expression (23.4).

As a result, the output voltage restriction command value Va*, whose phase matches that of the MTPI estimated output voltage fluctuation component ΔVa_mtpi and whose peak value of the fluctuation amplitude is equal to or less than the output voltage limit value Vdq_limit, is generated.

Furthermore, for example, as illustrated in a case (c) of FIG. 9, when the average output voltage command value Va0* of the MTPI estimated output voltage fluctuation component ΔVa_mtpi is equal to or more than the output voltage limit value Vdq_limit, the condition of Expression (23.1) is satisfied, and thus the MTPI voltage amplitude restriction processor 14b1-7 sets the amplitude ratio scale of the output voltage fluctuation component to "0". Then, the MTPI voltage amplitude restriction processor 14b1-7 sets "scale=0" in Expression (23.4), and outputs the fluctuation output voltage restriction command value ΔVa_limit_mtpi as "0". As a result, the output voltage restriction command value Va* matches the output voltage limit value Vdq_limit.

Figure 10:
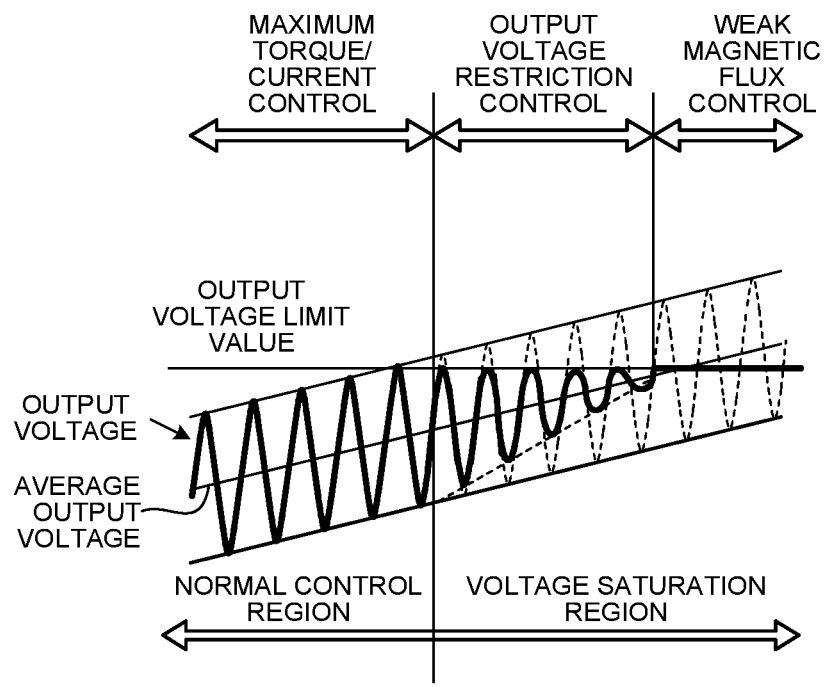
FIG. 10 illustrates one example of an output voltage waveform according to the first embodiment of the present disclosure.

The output voltage amplitude Va in the normal control region can be made to match that of the voltage saturation region while the output voltage amplitude Va is maintained to equal to or less than the output voltage limit value Vdq_limit also after the control region of the motor M transitions from the normal control region to the voltage saturation region by controlling the output voltage restriction command value Va* in this way as in one example of the output voltage waveform in FIG. 10. Therefore, the switching shock at the time of transition from the normal control region to the voltage saturation region can be reduced. Moreover, the motor control device 100 includes the voltage saturation region voltage command value generator 14b. It is thus possible to address a case where the average output voltage command value Va0*, which is the center of fluctuation of the output voltage restriction command value Va*, is restricted by the output voltage limit value Vdq_limit in the voltage saturation region.

<Configuration of Normal Control Region Voltage Command Value Generator>

Figure 11:
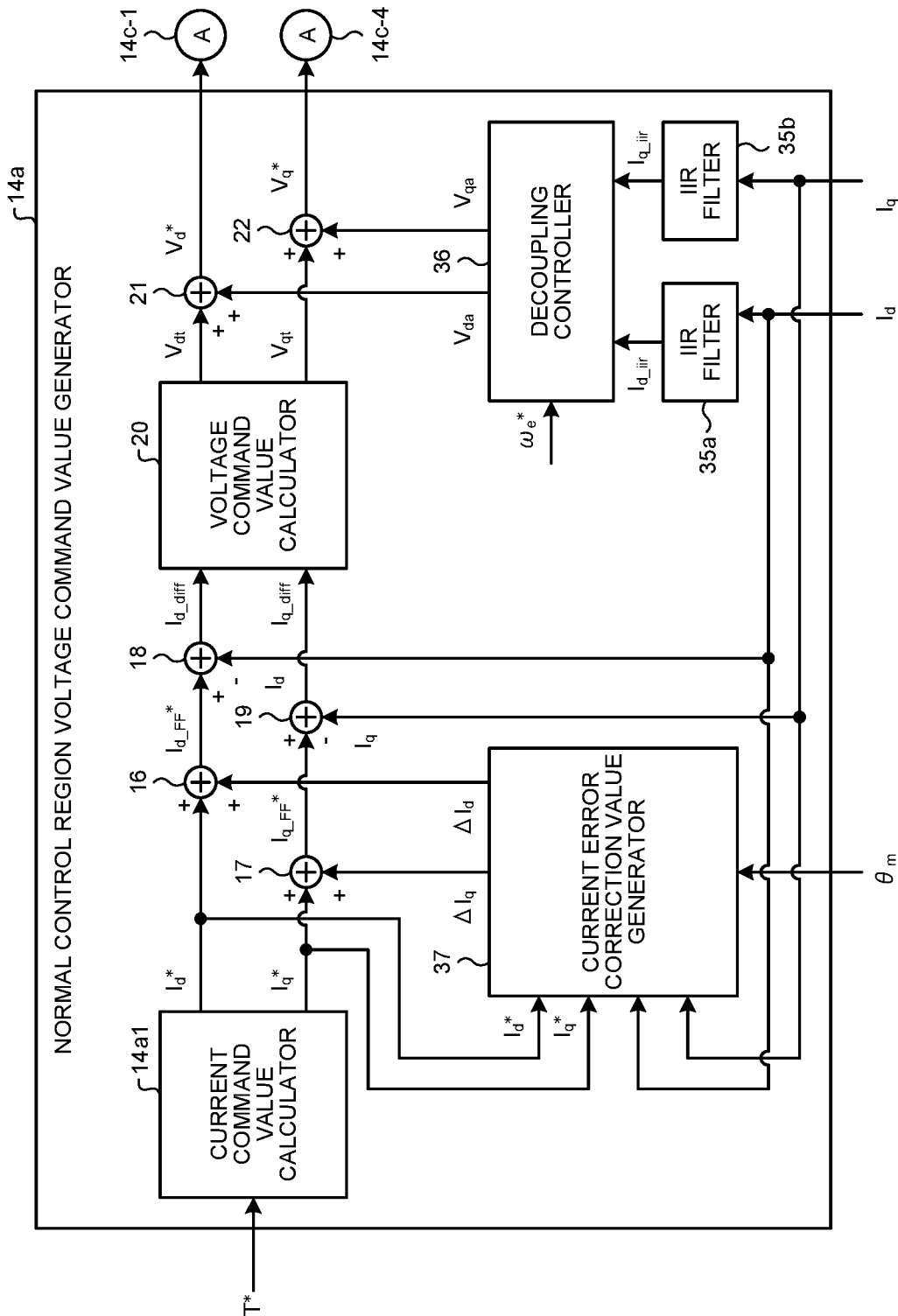
FIG. 11 illustrates a configuration example of a normal control region voltage command value generator according to the first embodiment of the present disclosure.

FIG. 11 illustrates a configuration example of the normal control region voltage command value generator according to the first embodiment of the present disclosure. In FIG. 11, the normal control region voltage command value generator 14a includes a current command value calculator 14a1, adders 16, 17, 21, and 22, subtractors 18 and 19, a voltage command value calculator 20, infinite impulse response (IIR) filters 35a and 35b, a decoupling controller 36, and a current error correction value generator 37.

The current command value calculator 14a1 calculates the q-axis current command value Iq* and the d-axis current command value Id* based on the point of intersection of the constant torque curve and the MTPI curve. The constant torque curve is a current locus in which the total torque command value T* is constant.

Here, the point of intersection of the constant torque curve and the MTPI curve can be calculated by using, for example, the motor torque expression in Expression (29) and Expression (17.1) indicating the relation between the d-axis current Id and the q-axis current Iq in the MTPI curve. Note that, in the right side of Expression (29), the first term represents magnet torque, and the second term represents reluctance torque. The magnet torque includes only the q-axis current Iq. The reluctance torque includes both the q-axis current Iq and the d-axis current Id. Therefore, appropriate torque can be generated in the motor M by appropriately controlling the q-axis current Iq and the d-axis current Id.

Expression (40), which is a quartic equation related to the q-axis current Iq, can be obtained by erasing the d-axis current Id from the Expressions (29) and (17.1).

$$(L_d - L_q)^2 \cdot I_q^4 + \Psi_a \cdot \frac{T}{P_n} \cdot I_q - \left(\frac{T}{P_n}\right)^2 = 0 \quad (40)$$

A solution corresponding to the q-axis current command value Iq* at the point of intersection of the constant torque curve of the total torque command value T* and the MTPI curve can be derived by using, for example, Newton method and the like to the quartic equation in Expression (40) as a solution of the quartic equation in Expression (40). Furthermore, the current command value calculator 14a1 calculates the d-axis current command value Id* by substituting the q-axis current command value Iq* calculated in accordance with Expression (40) into Expression (17.1).

The adder 17 calculates a q-axis current correction command value Iq_FF* by adding the q-axis current command value Iq* output by the current command value calculator 14a1 and a q-axis current error correction value ΔIq output by the current error correction value generator 37 together in accordance with Expression (41.1). The adder 16 calculates a d-axis current correction command value Id_FF* by adding the d-axis current command value Id* output by the current command value calculator 14a1 and a d-axis current error correction value ΔId output by the current error correction value generator 37 together in accordance with Expression (41.2).

$$I_{q\_FF}* = I_q* + \Delta I_q \quad (41.1)$$

$$I_{d\_FF}* = I_d* + \Delta I_d \quad (41.2)$$

The subtractor 19 calculates a q-axis current error Iq_diff, which is an error between the q-axis current correction command value Iq_FF* and the q-axis current Iq by subtracting the q-axis current Iq output by the u, v, w/d-q converter 29 from the q-axis current correction command value Iq_FF* output by the adder 17. The subtractor 18 calculates a d-axis current error Id_diff, which is an error between the d-axis current correction command value Id_FF* and the d-axis current Id by subtracting the d-axis current Id output by the u, v, w/d-q converter 29 from the d-axis current correction command value Id_FF* output by the adder 16.

The voltage command value calculator 20 calculates a pre-decoupling q-axis voltage command value Vqt by performing proportional integral (PI) control on the q-axis current error Iq_diff (Iq_FF*−Iq) in accordance with Expression (42.1). Furthermore, the voltage command value calculator 20 calculates a pre-decoupling d-axis voltage command value Vdt by performing the PI control on the d-axis current error Id_diff (Id_FF*−Id) in accordance with Expression (42.2). Note that kp_q in Expression (42.1) and kp_d in Expression (42.2) are proportional constants, and ki_q in Expression (42.1) and ki_d in Expression (42.2) are integral constants.

$$V_{qt} = k_{p\_q} \cdot (I_{q\_FF}* - I_q) + \int k_{i\_q} \cdot (I_{q\_FF}* - I_q) \cdot dt \quad (42.1)$$

$$V_{dt} = k_{p\_d} \cdot (I_{d\_FF}* - I_d) + \int k_{i\_d} \cdot (I_{d\_FF}* - I_d) \cdot dt \quad (42.2)$$

The adder 22 calculates the q-axis voltage command value Vq* by adding a q-axis decoupling correction value Vqa expressed in Expression (43.1) to the pre-decoupling q-axis voltage command value Vqt in accordance with Expression (43.3). The adder 21 calculates the d-axis voltage command value Vd* by adding a d-axis decoupling correction value Vda expressed in Expression (43.2) to the pre-decoupling d-axis voltage command value Vdt in accordance with Expression (43.4). As a result, the q-axis voltage command value Vq* and the d-axis voltage command value Vd* in which the interference between the dq-axes is canceled in a feedforward manner is calculated.

$$V_{qa} = \omega_e* \cdot (L_d \cdot I_{d\_iir} + \Psi_a) \quad (43.1)$$

$$V_{da} = -\omega_e* \cdot L_q \cdot I_{q\_iir} \quad (43.2)$$

$$V_q* = V_{qt} + V_{qa} \quad (43.3)$$

$$V_d* = V_{dt} + V_{da} \quad (43.4)$$

The infinite impulse response (IIR) filter 35a removes noise of the d-axis current Id output by the u, v, w/d-q converter 29, and outputs a d-axis response current Id_iir after the noise removal. The IIR filter 35b removes noise of the q-axis current Iq output by the u, v, w/d-q converter 29, and outputs a q-axis response current Iq_iir after the noise removal. The IIR filters 35a and 35b are examples of a noise removing filter.

The decoupling controller 36 generates the d-axis decoupling correction value Vda for correcting the pre-decoupling d-axis voltage command value Vdt based on an electric angular velocity command value ωe* input from the outside (e.g., higher-level controller) of the motor control device 100 and the q-axis response current Iq_iir. Furthermore, the decoupling controller 36 generates the q-axis decoupling correction value Vqa for correcting the pre-decoupling q-axis voltage command value Vqt based on the electric angular velocity command value ωe* and the d-axis response current Id_iir. The d-axis decoupling correction value Vda and the q-axis decoupling correction value Vqa are correction values for canceling the interference term between the dq-axes in a feedforward manner. Here, in order to achieve stable control, the decoupling correction values are desirably DC-electrified. Therefore, in order to generate a decoupling correction value, the electric angular velocity command value ωe* is used for velocity, and the d-axis response current Id_iir and the q-axis response current Iq_iir, from which a fluctuation component is removed by the IIR filter, are used for the d-axis current Id and the q-axis current Iq.

The current error correction value generator 37 generates the d-axis current error correction value ΔId and the q-axis current error correction value ΔIq based on the d-axis current command value Id* and the q-axis current command value Iq* output by the current command value calculator 14a1, the d-axis current Id and the q-axis current Iq output by the u, v, w/d-q converter 29, and the mechanical angle phase θm output by the position estimator 32.

The current error correction value generator 37 integrates a fluctuation error (phase error and amplitude error) that occurs when a dq-axis current is not able to follow a current command value due to response delay of the current command value calculator 14a1 and interference of dq-axes, and generates inverted output of the integration value as a current error correction value (d-axis current error correction value ΔId and q-axis current error correction value ΔIq). Here, the d-axis current error correction value ΔId is a feedforward component for correcting a fluctuation error between a d-axis current command value I* and the d-axis current Id. The q-axis current error correction value ΔIq is a feedforward component for correcting a fluctuation error between the q-axis current command value Iq* and the q-axis current Iq.

<Configuration of Current Error Correction Value Generator>

Figure 12:
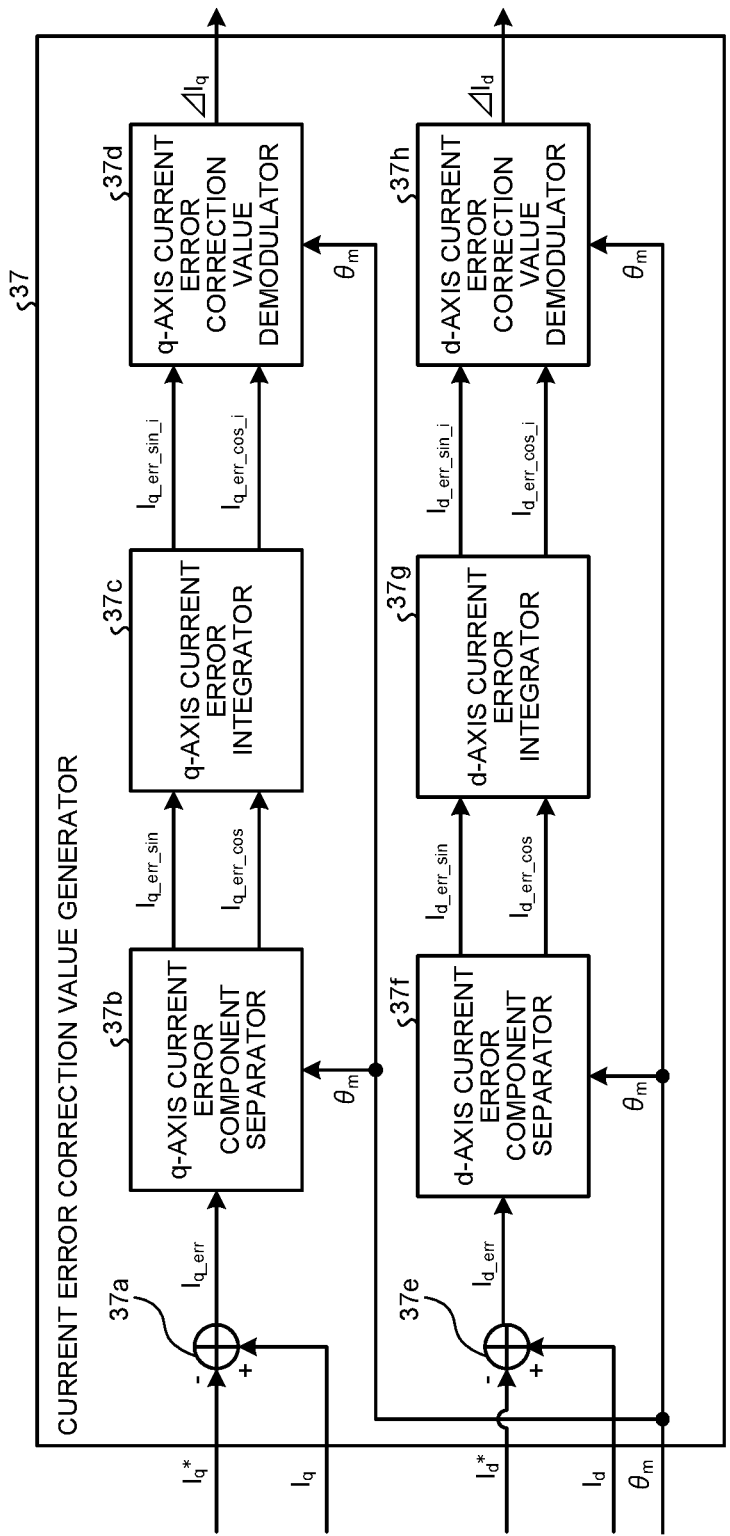
FIG. 12 illustrates a configuration example of a current error correction value generator according to the first embodiment of the present disclosure.

FIG. 12 illustrates a configuration example of the current error correction value generator according to the first embodiment of the present disclosure. In FIG. 12, the current error correction value generator 37 includes subtractors 37a and 37e, a q-axis current error component separator 37b, a q-axis current error integrator 37c, a q-axis current error correction value demodulator 37d, a d-axis current error component separator 37f, a d-axis current error integrator 37g, and a d-axis current error correction value demodulator 37h.

The subtractor 37a calculates a q-axis current fluctuation error Iq_err, which is an error between the q-axis current Iq and the q-axis current command value Iq*, in accordance with Expression (44).

$$I_{q\_err} = I_q - I_q^* \tag{44}$$

The q-axis current error component separator 37b calculates two Fourier coefficients Iq_err_sin (sin component) and Iq_err_cos (cos component), which are fundamental wave components of the q-axis current fluctuation error Iq_err, for each mechanical angle cycle in accordance with Expressions (45.1) and (45.2).

$$I_{q\_err\_sin} = \frac{1}{\pi} \int_0^{2\pi} I_{q\_err} \cdot \sin(\theta_m) d\theta_m \tag{45.1}$$

$$I_{q\_err\_cos} = \frac{1}{\pi} \int_0^{2\pi} I_{q\_err} \cdot \cos(\theta_m) d\theta_m \tag{45.2}$$

The q-axis current error integrator 37c multiplies each of the sin component Iq_err_sin of the q-axis current fluctuation error Iq_err and the cos component Iq_err_cos of the q-axis current fluctuation error Iq_err by the correction gain k in accordance with Expressions (46.1) and (46.2), and adds the multiplication results to Iq_err_sin_i_old and Iq_err_cos_i_old. In Expression (46.1), Iq_err_sin_i is an integration value of Iq_err_sin up to a mechanical angle cycle of this time. In Expression (46.2), Iq_err_cos_i is an integration value of Iq_err_cos up to the mechanical angle cycle of this time. Furthermore, Iq_err_sin_i_old in Expression (46.1) is Iq_err_sin_i up to a mechanical angle cycle of the previous time, and Iq_err_cos_i_old in Expression (46.2) is Iq_err_cos_i up to the mechanical angle cycle of the previous time.

$$I_{q\_err\_sin\_i} = I_{q\_err\_sin} \cdot k + I_{q\_err\_sin\_i\_old} \tag{46.1}$$

$$I_{q\_err\_cos\_i} = I_{q\_err\_cos} \cdot k + I_{q\_err\_cos\_i\_old} \tag{46.2}$$

The q-axis current error correction value demodulator 37d calculates the q-axis current error correction value ΔIq in accordance with Expressions (47.1) and (47.2). As a result, the phase of the q-axis current fluctuation error is inverted, and the instantaneous value of the q-axis current error correction value ΔIq at the mechanical angle phase θm is calculated.

$$\Delta I_q = I_{q\_err\_sin\_i} \cdot \sin(\theta_m - \pi) + I_{q\_err\_cos\_i} \cdot \cos(\theta_m - \pi) \tag{47.1}$$

$$= -I_{q\_err\_sin\_i} \cdot \sin(\theta_m) - I_{q\_err\_cos\_i} \cdot \cos(\theta_m) \tag{47.2}$$

The subtractor 37e calculates a d-axis current fluctuation error Id_err, which is an error between the d-axis current Id and the d-axis current command value Id*, in accordance with Expression (48).

$$I_{d\_err} = I_d^* - I_d \tag{48}$$

The d-axis current error component separator 37f calculates two Fourier coefficients Id_err_sin (sin component) and Id_err_cos (cos component), which are fundamental wave components of the d-axis current fluctuation error Id_err, for each mechanical angle cycle, in accordance with Expressions (49.1) and (49.2).

$$I_{d\_err\_sin} = \frac{1}{\pi} \int_0^{2\pi} I_{d\_err} \cdot \sin(\theta_m) d\theta_m \tag{49.1}$$

$$I_{d\_err\_cos} = \frac{1}{\pi} \int_0^{2\pi} I_{d\_err} \cdot \cos(\theta_m) d\theta_m \tag{49.2}$$

The d-axis current error integrator 37g multiplies each of the sin component Id_err_sin of the d-axis current fluctuation error Id_err and the cos component Id_err_cos of the d-axis current fluctuation error Id_err by the correction gain k in accordance with Expressions (50.1) and (50.2), and adds the multiplication results to Id_err_sin_i_old and Id_err_cos_i_old. In Expression (50.1), Id_err_sin_i is an integration value of Id_err_sin up to a mechanical angle cycle of this time. In Expression (50.2), Id_err_cos_i is an integration value of Id_err_cos up to the mechanical angle cycle of this time. Furthermore, Id_err_sin_i_old in Expression (50.1) is Id_err_sin_i up to a mechanical angle cycle of the previous time, and Id_err_cos_i_old in Expression (50.2) is Id_err_cos_i up to the mechanical angle cycle of the previous time.

$$I_{d\_err\_sin\_i} = I_{d\_err\_sin} \cdot k + I_{d\_err\_sin\_i\_old} \tag{50.1}$$

$$I_{d\_err\_cos\_i} = I_{d\_err\_cos} \cdot k + I_{d\_err\_cos\_i\_old} \tag{50.2}$$

The d-axis current error correction value demodulator 37h calculates the d-axis current error correction value ΔId in accordance with Expressions (51.1) and (51.2). As a result, the phase of the d-axis current fluctuation error is inverted, and the instantaneous value of the d-axis current error correction value ΔId at the mechanical angle phase θm is generated.

$$\Delta I_d = I_{d\_err\_sin\_i} \cdot \sin(\theta_m - \pi) + I_{d\_err\_cos\_i} \cdot \cos(\theta_m - \pi) \tag{51.1}$$

$$= -I_{d\_err\_sin\_i} \cdot \sin(\theta_m) - I_{d\_err\_cos\_i} \cdot \cos(\theta_m) \tag{51.2}$$

The first embodiment of the present disclosure has been described above.

Second Embodiment

The first embodiment of the present disclosure is effective when the motor M has small distortion of induced voltage. An actual induced voltage waveform, however, has induced voltage distortion due to the structure of the motor M. In the case of large induced voltage distortion, the motor M has large current harmonics. As a result, the motor M may have poor followability of current control. Therefore, in a second embodiment, the followability of current control of the motor M is enhanced, and the stability of control is further improved. Therefore, the second embodiment is partially different from the first embodiment in the configuration of the voltage saturation region voltage command value generator 14b.

<Configuration of Voltage Saturation Region Voltage Command Value Generator>

Figure 13:
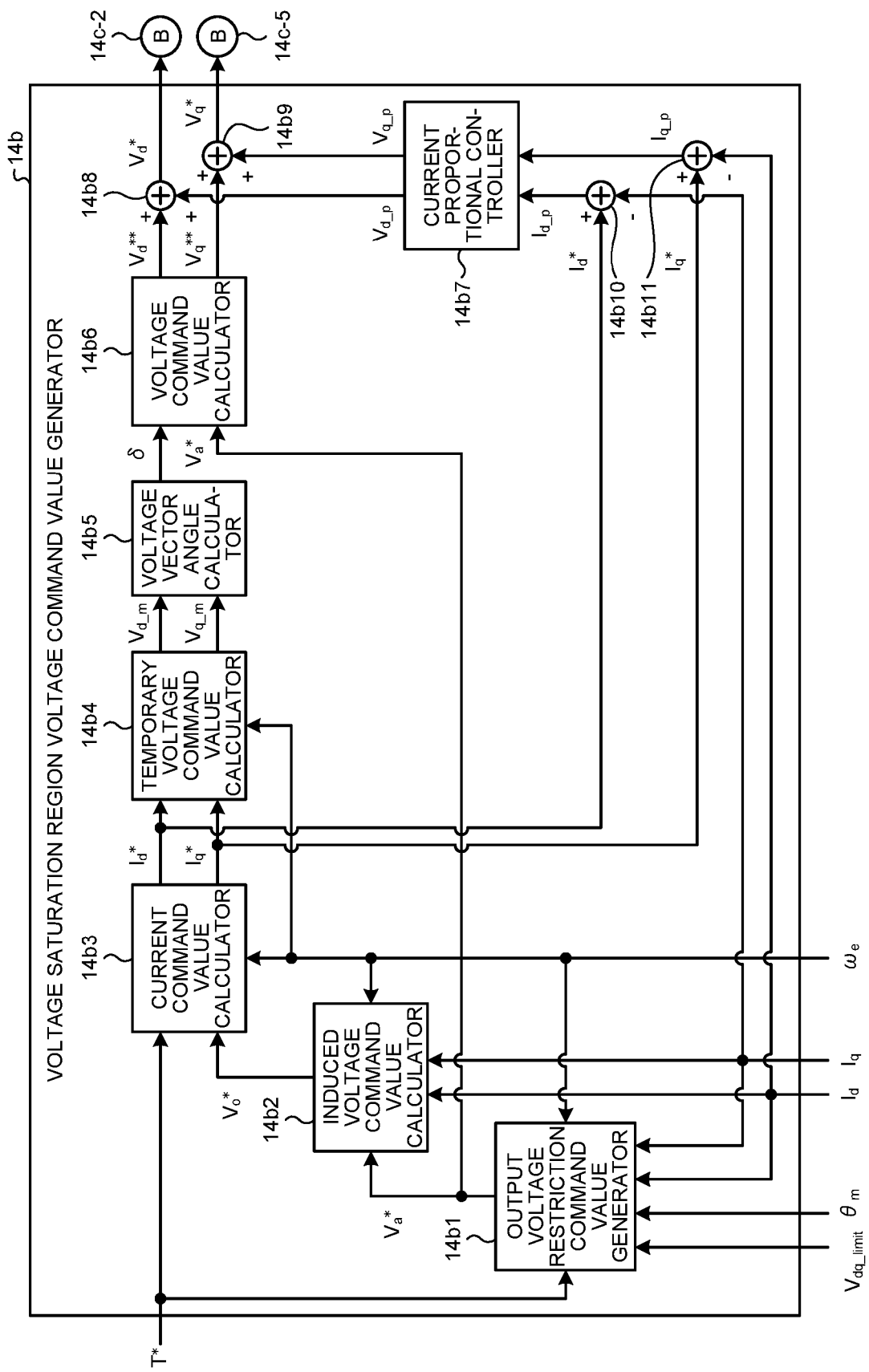
FIG. 13 illustrates a configuration example of a voltage saturation region voltage command value generator according to a second embodiment of the present disclosure.

FIG. 13 illustrates a configuration example of a voltage saturation region voltage command value generator 14b according to the second embodiment of the present disclosure. In FIG. 13, the second embodiment is the same as the first embodiment (FIG. 5) in that the voltage saturation region voltage command value generator 14b includes the output voltage restriction command value generator 14b1, the induced voltage command value calculator 14b2, the current command value calculator 14b3, the temporary voltage command value calculator 14b4, the voltage vector angle calculator 14b5, and the voltage command value calculator 14b6. In the second embodiment, the voltage saturation region voltage command value generator 14b further includes a current proportional controller 14b7, adders 14b8 and 14b9, and subtractors 14b10 and 14b11.

In FIG. 13, as in the first embodiment, the voltage saturation region voltage command value generator 14b outputs a d-axis voltage command value Vd calculated by the voltage command value calculator 14b6 to the adder 14b8, and outputs a calculated q-axis voltage command value Vq to the adder 14b9.

Note that, in the first embodiment, the d-axis voltage command value and the q-axis voltage command value output from the voltage command value calculator 14b6 are respectively denoted as Vd* and Vq*, while, in the second embodiment, the d-axis voltage command value and the q-axis voltage command value output from the voltage command value calculator 14b6 are respectively denoted as Vd and Vq. That is, the d-axis voltage command value Vd and the q-axis voltage command value Vq in the second embodiment correspond to the d-axis voltage command value Vd* and the q-axis voltage command value Vq* in the first embodiment.

The current command value calculator 14b3 outputs the calculated q-axis current command value Iq* and d-axis current command value Id* to the temporary voltage command value calculator 14b4. Furthermore, the current command value calculator 14b3 outputs the calculated q-axis current command value Iq* to the subtractor 14b11, and outputs the calculated d-axis current command value Id* to the subtractor 14b10.

The subtractor 14b10 calculates a d-axis current error Id_p by subtracting the d-axis current Id from the d-axis current command value Id*, and outputs the calculated d-axis current error Id_p to the current proportional controller 14b7. The subtractor 14b11 calculates a q-axis current error Iq_p by subtracting the q-axis current Iq from the q-axis current command value Iq*, and outputs the calculated q-axis current error Iq_p to the current proportional controller 14b7.

The current proportional controller 14b7 calculates a d-axis compensation voltage Vd_p by multiplying the d-axis current error Id_p by a proportional constant kp_d, and outputs the calculated d-axis compensation voltage Vd_p to the adder 14b8. Furthermore, the current proportional controller 14b7 calculates a q-axis compensation voltage Vq p by multiplying the q-axis current error Iq_p by a proportional constant kp_q, and outputs the calculated q-axis compensation voltage Vq p to the adder 14b9. That is, the d-axis compensation voltage Vd_p is calculated as "kp_d·Id_p", and the q-axis compensation voltage Vq p is calculated as "kp_q·Iq_p".

The adder 14b8 calculates the final d-axis voltage command value Vd* by adding the d-axis compensation voltage Vd_p output by the current proportional controller 14b7 to the d-axis voltage command value Vd** output by the voltage command value calculator 14b6. Furthermore, the adder 14b9 calculates the final q-axis voltage command value Vq* by adding the q-axis compensation voltage Vq p output by the current proportional controller 14b7 to the q-axis voltage command value Vq** output by the voltage command value calculator 14b6.

Current harmonics due to induced voltage distortion can be inhibited by adding the current proportional controller 14b7 in this way, and followability to a current command value can be further improved.

The second embodiment has been described above.

As described above, the motor control device (motor control device 100 of first embodiment) of the present disclosure includes the voltage command value generator (voltage command value generator 14 of first embodiment) and the control switching determination unit 15. The control switching determination unit 15 determines whether the control region of the motor (motor M of first embodiment) is in the voltage saturation region or the normal control region. The voltage command value generator generates a voltage command value (d-axis voltage command value Vd* and q-axis voltage command value Vq* of first embodiment) of the motor based on the velocity command value (mechanical angular velocity command value ωm* of first embodiment) and a motor velocity (mechanical angle estimated angular velocity ωm of first embodiment). Furthermore, when the control switching determination unit determines that the control region of the motor is in the voltage saturation region, the voltage command value generator determines the voltage vector angle (voltage vector angle δ of first embodiment) of an output voltage to be applied to the motor from the torque command value (total torque command value T* of first embodiment) and the limit value (output voltage restriction command value Va* of first embodiment) of the maximum voltage capable of being output to the motor, and generates the voltage command value based on the voltage vector angle.

In this way, output torque fluctuation to velocity fluctuation can be optimized while fluctuation of a voltage amplitude is inhibited. Damping effects of the motor at the time of torque control in the voltage saturation region can be improved.

Furthermore, the voltage command value calculator calculates current command values (q-axis current command value Iq* and d-axis current command value Id* of first embodiment) of the motor based on the point of intersection of the constant torque curve of the motor and the constant induced voltage ellipse of the motor.

Furthermore, the voltage command value generator calculates the temporary voltage command values (temporary d-axis voltage command value Vd_m and temporary q-axis voltage command value Vq_m of first embodiment) in accordance with the motor model expressions (Expressions (37.1) and (37.2) of second embodiment) based on the current command value, and calculates the voltage vector angle based on the temporary voltage command values.

In this way, the voltage vector angle can be calculated in a feedforward manner, and integral control is not needed, which can prevent occurrence of the windup (saturation phenomenon).

Furthermore, the voltage command value calculator (voltage command value calculator 14 of second embodiment) includes a proportional controller (current proportional controller 14b7 of second embodiment) that calculates compensation voltages (d-axis compensation voltage Vd_p and q-axis compensation voltage Vq p of second embodiment)

by multiplying the errors (d-axis current error Id_p and q-axis current error Iq_p of second embodiment) between the current command value and currents (d-axis current Id and q-axis current Iq of second embodiment) of the motor by a proportional constant (proportional constant ka of second embodiment), and calculates the voltage command value to which the compensation voltages are added.

In this way, harmonic current generated by induced voltage distortion and the like can be inhibited only by proportional control to improve the followability to a current command value.

REFERENCE SIGNS LIST

100 MOTOR CONTROL DEVICE
14 VOLTAGE COMMAND VALUE GENERATOR
14a NORMAL CONTROL REGION VOLTAGE COMMAND VALUE GENERATOR
14b VOLTAGE SATURATION REGION VOLTAGE COMMAND VALUE GENERATOR
14b1 OUTPUT VOLTAGE RESTRICTION COMMAND VALUE GENERATOR
14b2 INDUCED VOLTAGE COMMAND VALUE CALCULATOR
14b3 CURRENT COMMAND VALUE CALCULATOR
14b4 TEMPORARY VOLTAGE COMMAND VALUE CALCULATOR
14b5 VOLTAGE VECTOR ANGLE CALCULATOR
14b6 VOLTAGE COMMAND VALUE CALCULATOR
14b7 CURRENT PROPORTIONAL CONTROLLER

What is claimed is:

1. A motor control device comprising:
a voltage command value generator that generates a voltage command value of a motor from a torque command value based on a velocity command value and a velocity of the motor; and
a control switching determination unit that determines whether or not a control region of the motor is in a voltage saturation region,
wherein, when the control switching determination unit determines that the control region is in the voltage saturation region,
the voltage command value generator generates the voltage command value based on the torque command value, a limit value of a maximum voltage capable of being output to the motor, and a voltage vector angle of an output voltage applied to the motor.

2. The motor control device according to claim 1, wherein the voltage command value generator calculates a current command value of the motor based on a point of intersection of a constant torque curve of the motor of the torque command value and a constant induced voltage ellipse of the motor, determines a voltage vector angle from the current command value, and generates a voltage command value.

3. The motor control device according to claim 2, wherein the voltage command value generator calculates a temporary voltage command value in accordance with a motor model expression based on the current command value, and calculates the voltage vector angle based on the temporary voltage command value.

4. The motor control device according to claim 1, wherein the voltage command value generator calculates a compensation voltage by multiplying an error between a current command value of the motor and a current of the motor by a proportional constant, and generates the voltage command value to which the compensation voltage has been added.

* * * * *